US012634106B2

(12) United States Patent
Tan et al.

(10) Patent No.: US 12,634,106 B2
(45) Date of Patent: May 19, 2026

(54) SERDES LANE CONTROL BONDING SYSTEMS AND METHODS

(71) Applicant: Lattice Semiconductor Corporation, Hillsboro, OR (US)

(72) Inventors: Choon Yee Tan, Bukit Mertajam (MY); Sze Yin Lee, Bayan Lepas (MY)

(73) Assignee: Lattice Semiconductor Corporation, Hillsboro, OR (US)

( * ) Notice: Subject to any disclaimer, the term of this patent is extended or adjusted under 35 U.S.C. 154(b) by 227 days.

(21) Appl. No.: 18/627,380

(22) Filed: Apr. 4, 2024

(65) Prior Publication Data

US 2025/0317269 A1    Oct. 9, 2025

(51) Int. Cl.
| | |
|---|---|
| *H04L 7/00* | (2006.01) |
| *G06F 13/42* | (2006.01) |
| *G06F 11/00* | (2006.01) |
| *H04L 12/28* | (2006.01) |
| *H04L 12/54* | (2022.01) |

(52) U.S. Cl.
CPC ........ *H04L 7/0033* (2013.01); *G06F 13/4291* (2013.01); *G06F 11/00* (2013.01); *H04L 12/28* (2013.01); *H04L 12/54* (2013.01)

(58) Field of Classification Search
CPC ....... H04L 7/0033; H04L 12/54; H04L 12/28; G06F 13/4291; G06F 11/00
See application file for complete search history.

(56) References Cited

U.S. PATENT DOCUMENTS

| | | | |
|---|---|---|---|
| 8,385,188 B2 * | 2/2013 | Tran .................... | G06F 13/4027 370/242 |
| 11,314,277 B1 | 4/2022 | Remla et al. | |
| 2009/0063889 A1 | 3/2009 | Dada et al. | |

FOREIGN PATENT DOCUMENTS

CN        106603276 B      4/2017

* cited by examiner

*Primary Examiner* — Joseph J Lauture
(74) *Attorney, Agent, or Firm* — Haynes and Boone, LLP

(57) ABSTRACT

Various techniques are provided to configure serializer/ deserializer (SerDes) lanes in one or more SerDes quads into configurable groups using a bonded link. The configuration registers may configure the SerDes lanes into the configurable groups. A lane bonding control module in each SerDes quad may link the signals, including control signals, that travel within each configurable group. To synchronize the control signals, the lane bonding control module may include one or more flops that introduce a fixed time delay for control signals that travel between SerDes quads, and pipe stage match modules that introduce a variable time delay to match the fixed time delay caused by the flops. Once synchronized, the control signals arrive at different SerDes lanes in the configurable group at the same clock cycle.

20 Claims, 32 Drawing Sheets

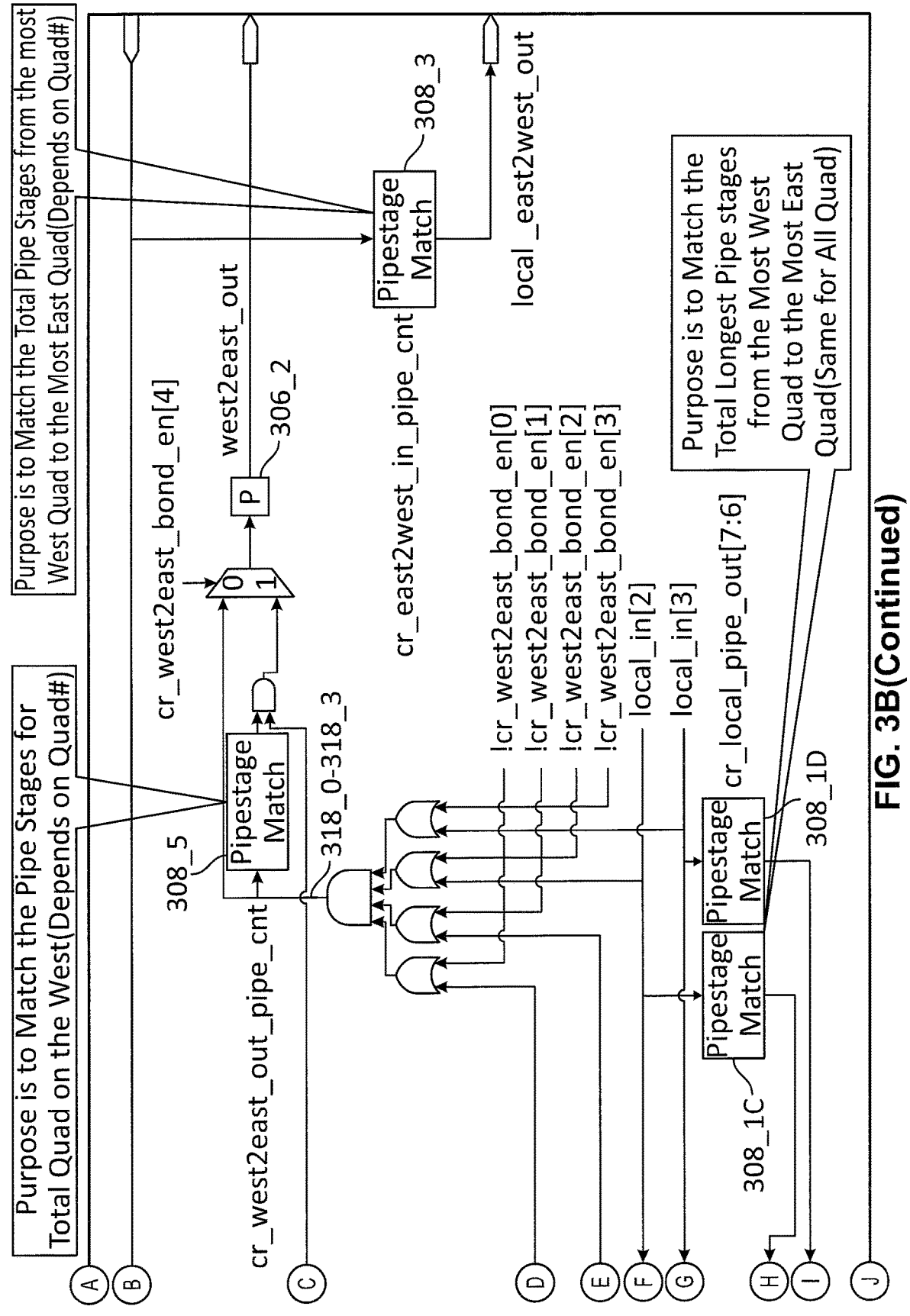

Purpose is to Match the Total Pipe Stages from the most West Quad to the Most East Quad(Depends on Quad#)

Purpose is to Match the Total Pipe Stages for West Quad to the Most East Quad(Depends on Quad#)

Purpose is to Match the Pipe Stages for Total Quad on the West(Depends on Quad#)

Purpose is to Match the Total Longest Pipe stages from the Most West Quad to the Most East Quad(Same for All Quad)

Pipestage Match   308_3 west2east_out local_east2west_out cr_west2east_bond_en[4]

306_2   P cr_east2west_in_pipe_cnt

Pipestage Match   308_5

318_0-318_3 cr_west2east_out_pipe_cnt

!cr_west2east_bond_en[0]
!cr_west2east_bond_en[1]
!cr_west2east_bond_en[2]
!cr_west2east_bond_en[3]

local_in[2]
local_in[3]

cr_local_pipe_out[7:6]

Pipestage Match   308_1D

Pipestage Match   308_1C

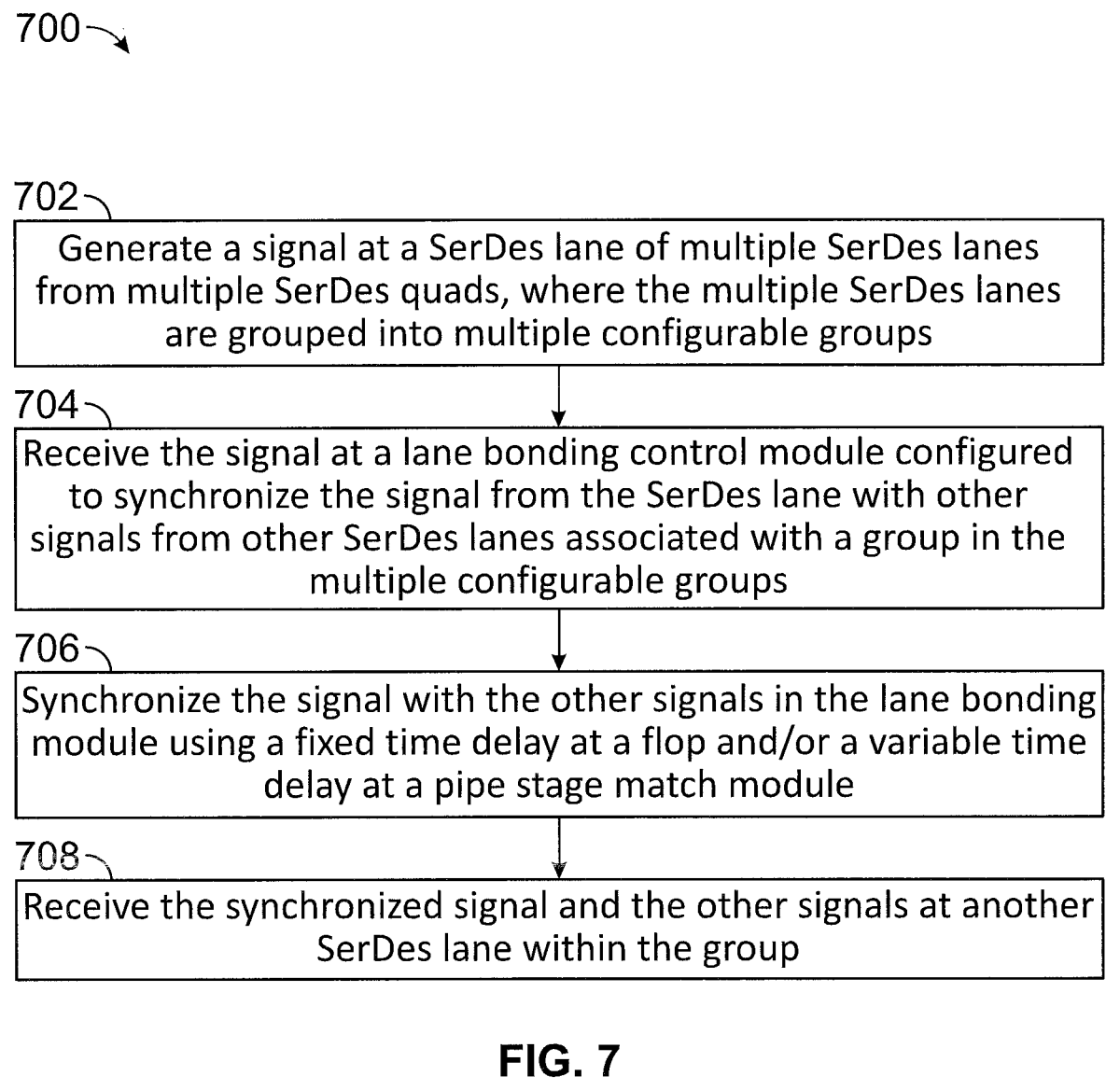

Generate a signal at a SerDes lane of multiple SerDes lanes from multiple SerDes quads, where the multiple SerDes lanes are grouped into multiple configurable groups

704

Receive the signal at a lane bonding control module configured to synchronize the signal from the SerDes lane with other signals from other SerDes lanes associated with a group in the multiple configurable groups

706

Synchronize the signal with the other signals in the lane bonding module using a fixed time delay at a flop and/or a variable time delay at a pipe stage match module

708

Receive the synchronized signal and the other signals at another SerDes lane within the group

FIG. 7

SERDES LANE CONTROL BONDING SYSTEMS AND METHODS

TECHNICAL FIELD

The disclosure generally relates to SerDes, and more specifically to bonding SerDes lanes into configurable groups.

BACKGROUND

Serializer/deserializer (SerDes) have layers, such as PMA/PCS/MAC, that provide various high speed protocol functionality. Each SerDes lane within a SerDes quad can operate by itself, e.g., as a PCIe×1 Link or in pairs with other SerDes lanes in the SerDes quad to form a HighSpeed protocol link with multiple lanes. To build an ASIC device with multiple SerDes lane configuration, more than one SerDes lane can be grouped together, e.g., a pair for a group of two SerDes lanes, or a "quad" for a group of four SerDes lanes. However, when the SerDes lanes are grouped, the grouping introduces signal delay from signals generated by different SerDes lanes in the group. Because of the delay, each SerDes lane may not receive the signals from other SerDes lanes in the group at the same time.

BRIEF DESCRIPTION OF THE DRAWINGS

FIG. 7 is a flowchart of an exemplary method for synchronizing a signal with other signals for transmission to SerDes lanes within a configurable group, according to some embodiments.

Embodiments of the present disclosure and their advantages are best understood by referring to the detailed description that follows. It should be appreciated that like reference numerals are used to identify like elements illustrated in one or more of the figures.

DETAILED DESCRIPTION

A programmable logic device (PLD) includes one or more serializer/deserializers (SerDes). The SerDes may be included in SerDes lanes and SerDes lanes may be grouped into groups of four, called SerDes quads. SerDes lanes within a SerDes quad or across multiple SerDes quads may be bounded into configurable groups using links. In each configurable group, the SerDes lanes can operate independently or multiple SerDes lanes can operate as a bonded link. When the SerDes lanes operate as a bonded link, the SerDes lanes in the group receive control signals at the same time.

The embodiments discussed herein described how SerDes lanes from one or multiple SerDes quads are grouped together in one or more groups with bonded links. The grouping may be configurable and flexible, and there may be a variable number of SerDes lanes within each group. The grouping also bonds any number of signals, including control signals, from available SerDes lanes within the group to support a variety of applications.

To bond the SerDes lanes within a group, SerDes quads include a lane bonding control module. The lane bonding control module may include pipe stage flops (or simply flops) and pipe stage match modules. The flops may synchronize signals, such as control signals, using a fixed time delay. Pipe stage match modules may match the fixed time delay for different control signals using a variable time delay. The variable time delay may correspond to a number of flops a control signal has travelled through as the control signal travels among multiple SerDes quads.

Configurable registers in the SerDes quad may identify the SerDes lanes that belong to a configurable group. Configurable registers may also identify the variable time delay that the pipe stage match modules may allocate to different control signals as the control signals are transmitted within the configurable group.

Figure 1:
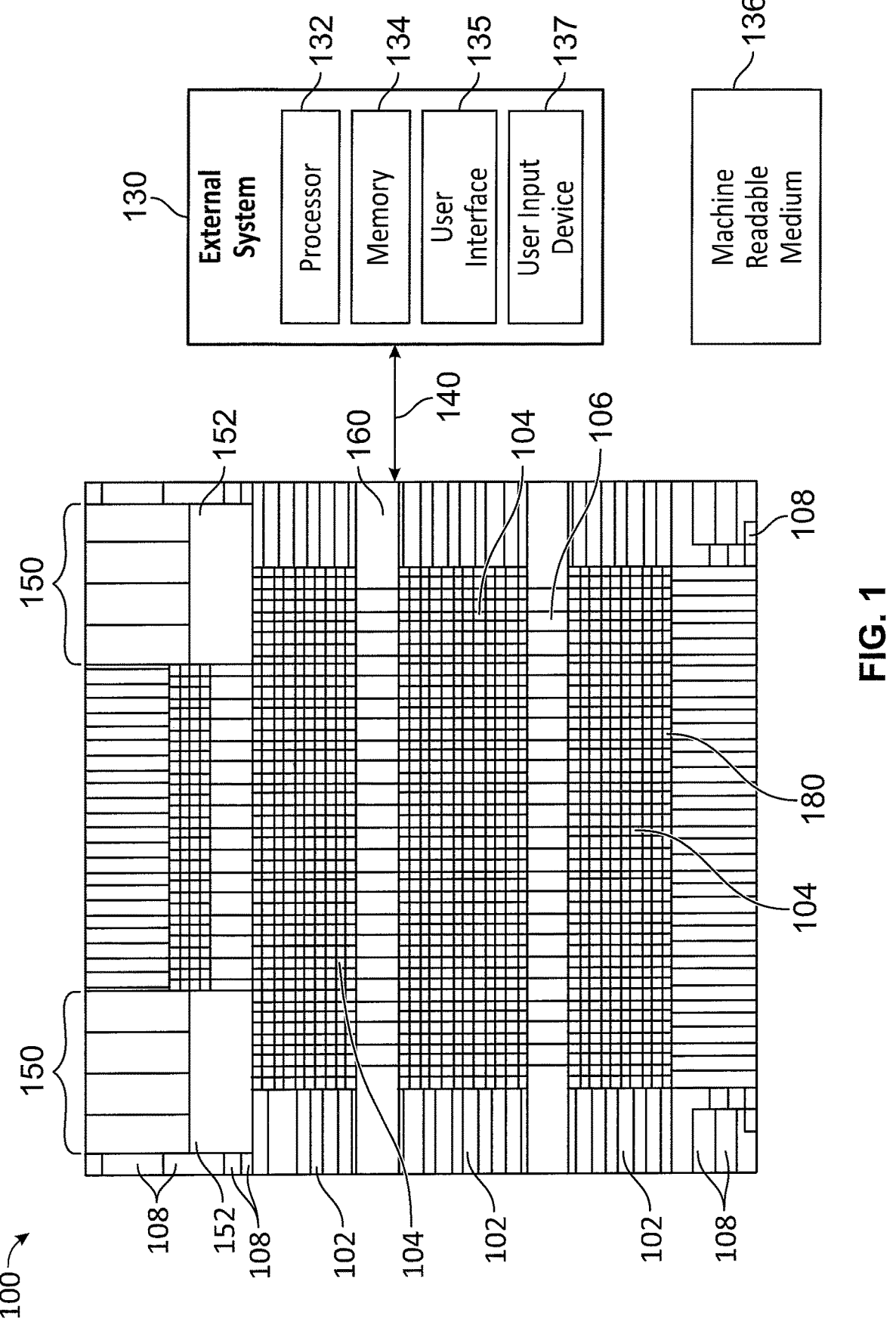
FIG. 1 illustrates a block diagram of a programmable logic device (PLD) in accordance with an embodiment.

FIG. 1 illustrates a block diagram of a programmable logic device (PLD) 100 in accordance with an embodiment of the disclosure. PLD 100 (e.g., a field programmable gate array (FPGA)), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)).

I/O blocks 102 provide I/O functionality (e.g., to support one or more I/O and/or memory interface standards) for PLD 100, while programmable logic blocks 104 provide logic functionality (e.g., LUT-based logic or logic gate array-based logic) for PLD 100. Additional I/O functionality may be provided by serializer/deserializer (SerDes) blocks 150 and physical coding sublayer (PCS) blocks 152. PLD 100 may also include hard intellectual property core (IP) blocks 160 to provide additional functionality (e.g., substantially predetermined functionality provided in hardware which may be configured with less programming than logic blocks 104).

PLD 100 may also include blocks of memory 106 (e.g., blocks of EEPROM, block SRAM, and/or flash memory), clock-related circuitry 108 (e.g., clock sources, PLL circuits, and/or DLL circuits), and/or various routing resources 180 (e.g., interconnect and appropriate switching logic to provide paths for routing signals throughout PLD 100, such as for clock signals, data signals, or others) as appropriate. In general, the various elements of PLD 100 may be used to perform their intended functions for desired applications, as would be understood by one skilled in the art.

For example, certain I/O blocks 102 may be used for programming memory 106 or transferring information (e.g., various types of user data and/or control signals) to/from PLD 100. Other I/O blocks 102 include a first programming port (which may represent a central processing unit (CPU) port, a peripheral data port, an SPI interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, I/O blocks 102 may be included to receive configuration data and commands (e.g., over one or more connections 140) to configure PLD 100 for its intended use and to support serial or parallel device configuration and information transfer with SerDes blocks 150, PCS blocks 152, hard IP blocks 160, and/or logic blocks 104 as appropriate.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout PLD 100, such as in and between logic blocks 104, hard IP blocks 160, and routing resources 180 to perform their conventional functions (e.g., storing configuration data that configures PLD 100 or providing interconnect structure within PLD 100). It should also be understood that the various embodiments disclosed herein are not limited to programmable logic devices, such as PLD 100, and may be applied to various other types of programmable devices, as would be understood by one skilled in the art.

An external system 130 may be used to create a desired user configuration or design of PLD 100 and generate corresponding configuration data to program (e.g., configure) PLD 100. For example, system 130 may provide such configuration data to one or more I/O blocks 102, SerDes blocks 150, and/or other portions of PLD 100. As a result, programmable logic blocks 104, various routing resources, and any other appropriate components of PLD 100 may be configured to operate in accordance with user-specified applications.

In the illustrated embodiment, system 130 is implemented as a computer system. In this regard, system 130 includes, for example, one or more processors 132 which may be configured to execute instructions, such as software instructions, provided in one or more memories 134 and/or stored in non-transitory form in one or more non-transitory machine readable mediums 136 (e.g., which may be internal or external to system 130). For example, in some embodiments, system 130 may run PLD configuration software, such as Lattice Diamond System Planner software available from Lattice Semiconductor Corporation to permit a user to create a desired configuration and generate corresponding configuration data to program PLD 100.

System 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of PLD 100.

In an ASIC device, SerDes block 150 may include multiple SerDes. In some instances, SerDes may be combined into SerDes quads having four SerDes lanes. Each SerDes lane may include one SerDes. There may be multiple SerDes quads within the SerDes block 150. The SerDes lanes in one or multiple SerDes quads may be grouped into one or more configurable groups. Within a single SerDes quad, the configurable groups may include four groups with one SerDes lanes within each group, two groups with a pair of SerDes lanes within each group, or one group with four SerDes lanes.

Figure 2A:
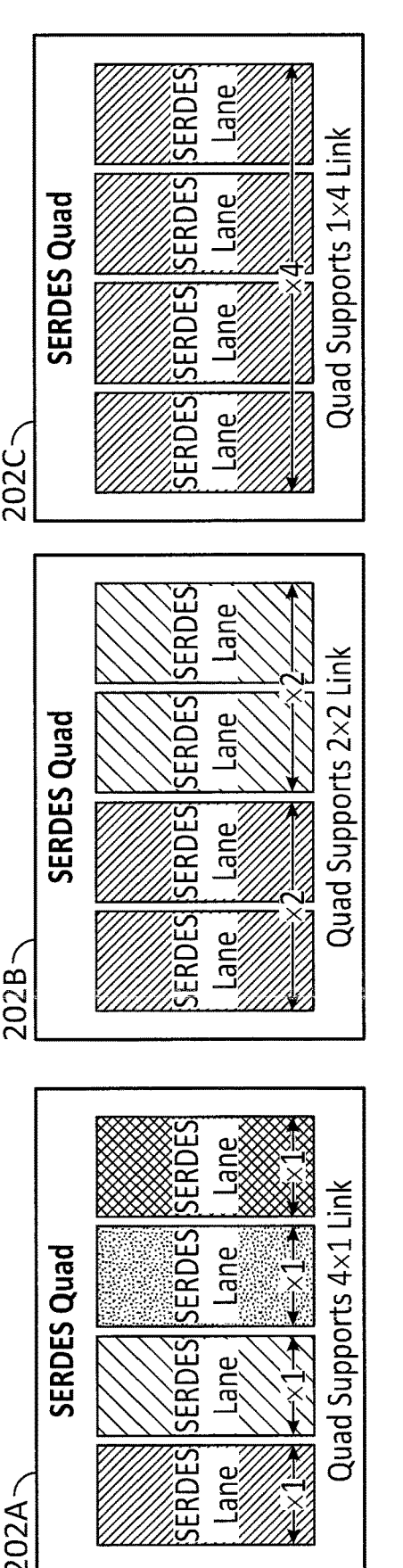
FIGS. 2A-B illustrate block diagrams of example serializer/deserializer (SerDes) lanes within a SerDes quad in various group configurations, according to some embodiments.
Figure 2B:
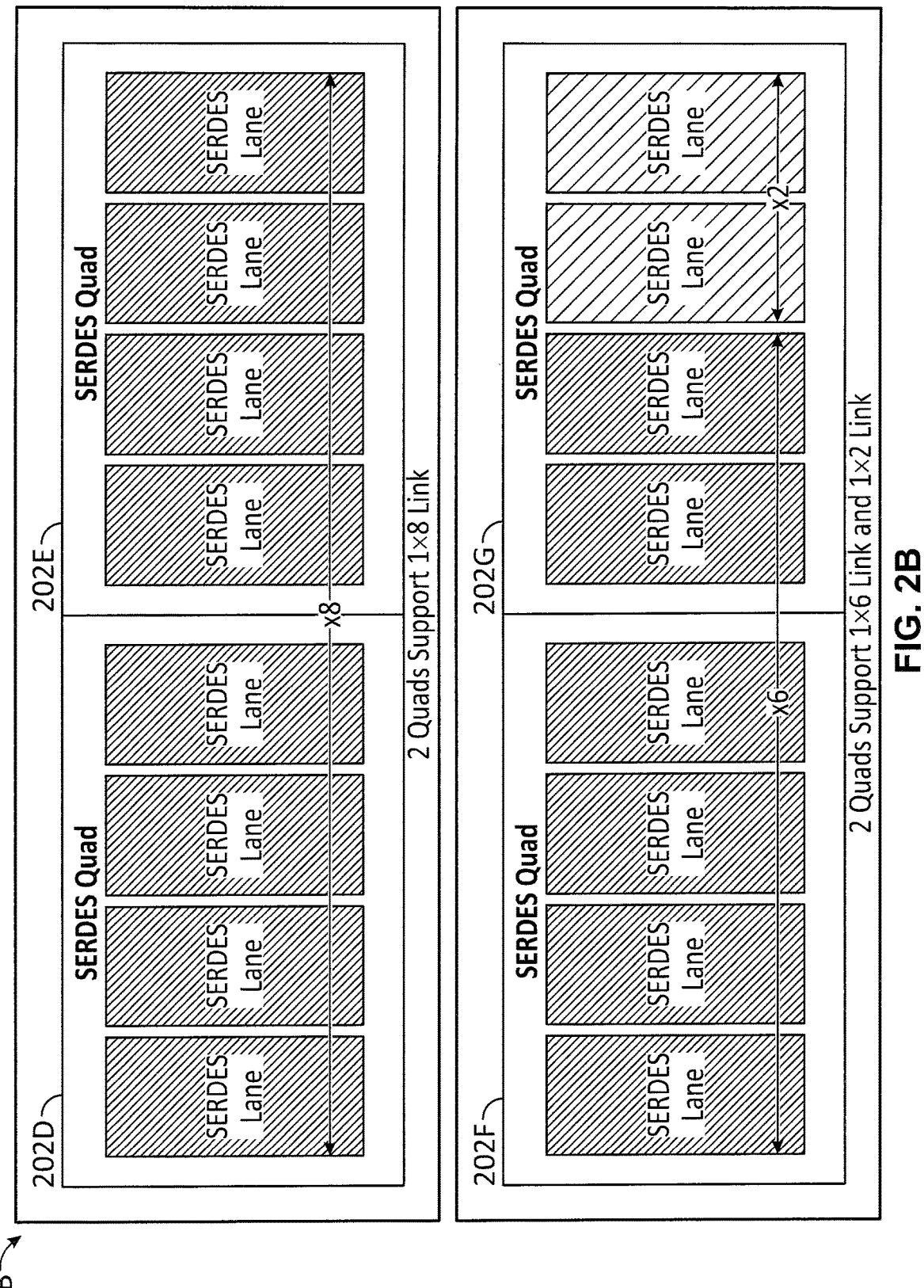

FIGS. 2A and 2B illustrate block diagrams of example group configurations within a SerDes quad, according to some embodiments. FIG. 2A illustrates SerDes quads 202A-C, with each SerDes quad 202 having four SerDes lanes. The four SerDes lanes may be grouped into configurable groups having various number of SerDes lanes. For example, SerDes quad 202A illustrates four independent SerDes lanes that are not linked to other SerDes lanes, in a 4×1 link configuration. SerDes quad 202B includes four SerDes lanes in a two group configuration, where two SerDes lanes are linked into each of the two groups in a 2×2 link configuration. SerDes quad 202C illustrates four SerDes lanes, where the four SerDes lanes form a single group in a 1×4 link configuration.

FIG. 2B illustrates SerDes quads 202D-G having different group configurations, where each group operates at different link widths. For example, SerDes quads 202D-E each have four SerDes. SerDes quads 202D-E may support an eight SerDes lanes group configuration where the eight SerDes lanes are linked to form a single group in a 1×8 link configuration. In another example, SerDes quads 202F-G also have four SerDes lanes each. SerDes quads 202F-G are linked into two configurable groups. The first group includes the four SerDes lanes in SerDes quad 202F and two lanes in SerDes quad 202G that are linked in a 1×6 link configuration. The second group includes the two SerDes lanes of SerDes quad 202G that are linked in a 1×2 link configuration.

Notably, the embodiments discussed in FIGS. 2A-B are exemplary, and other configuration groups may be configured. Further SerDes block 150 discussed in FIG. 1 is not limited to SerDes quads with four SerDes lanes shown in FIGS. 2A-B, and may include other numbers of SerDes lanes.

For example purposes only, suppose SerDes quads 202D, 202E, and 202F are grouped together (not shown). In this example, there may be multiple group configurations using three SerDes quads 202D-F, such as a configuration where a first group includes two SerDes lanes of SerDes quad 202D in a 1×2 link configuration, a second group includes last two SerDes lanes of SerDes quad 202D and first two SerDes lanes of SerDes quad 202E in a 2×4 link configuration, and a third group that includes the last two Serdes lanes of SerDes quad 202E and all lanes of SerDes quad 202F. In another example, there may be a 1×12 link configuration that includes all SerDes lanes in SerDes quads 202D-F. Notably, other SerDes lane groupings may be configured in different configurations within SerDes quads 202D-F.

Figure 3A:
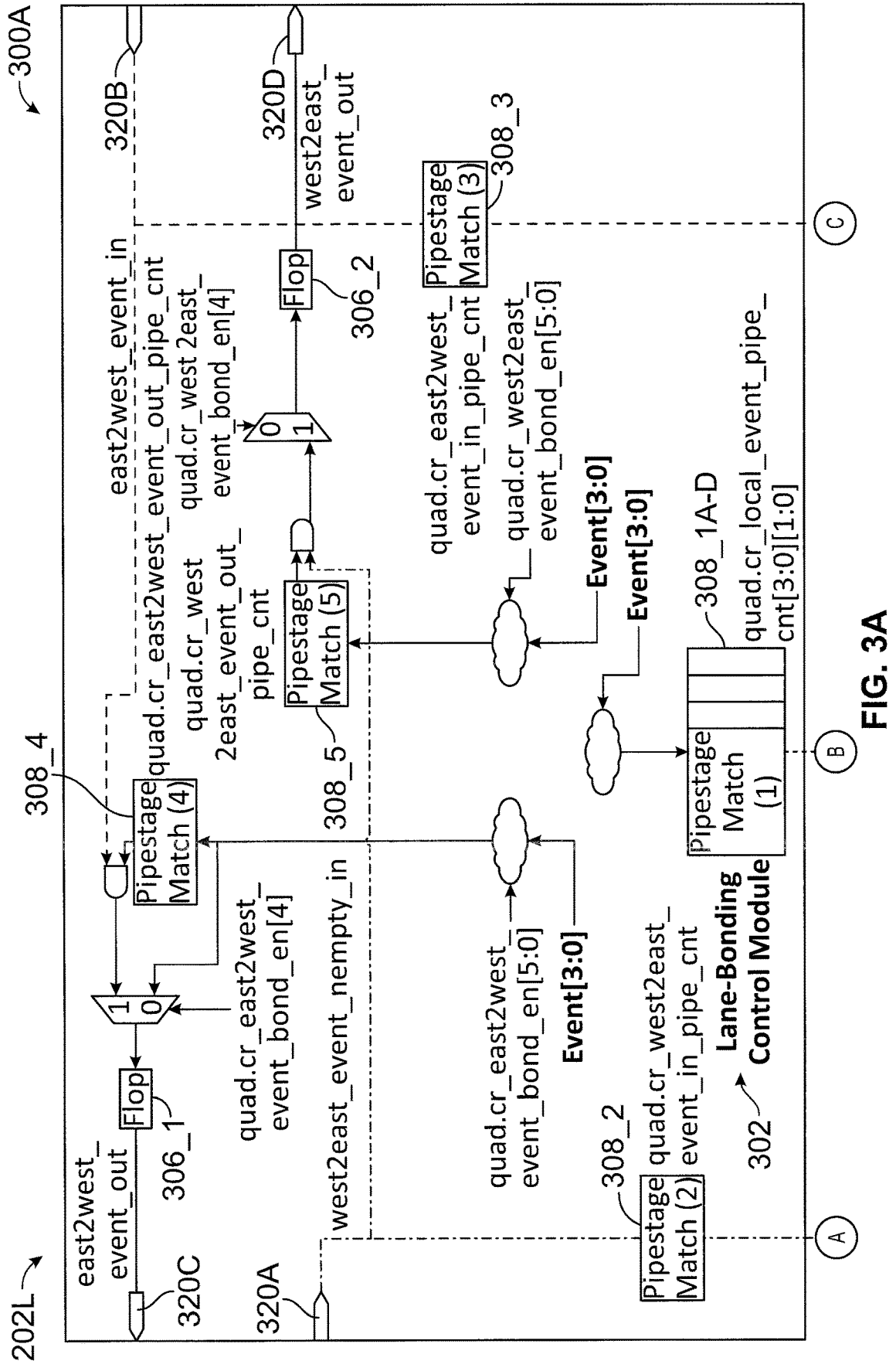
FIG. 3A illustrates a diagram of a SerDes quad, according to some embodiments.
Figure 3A:
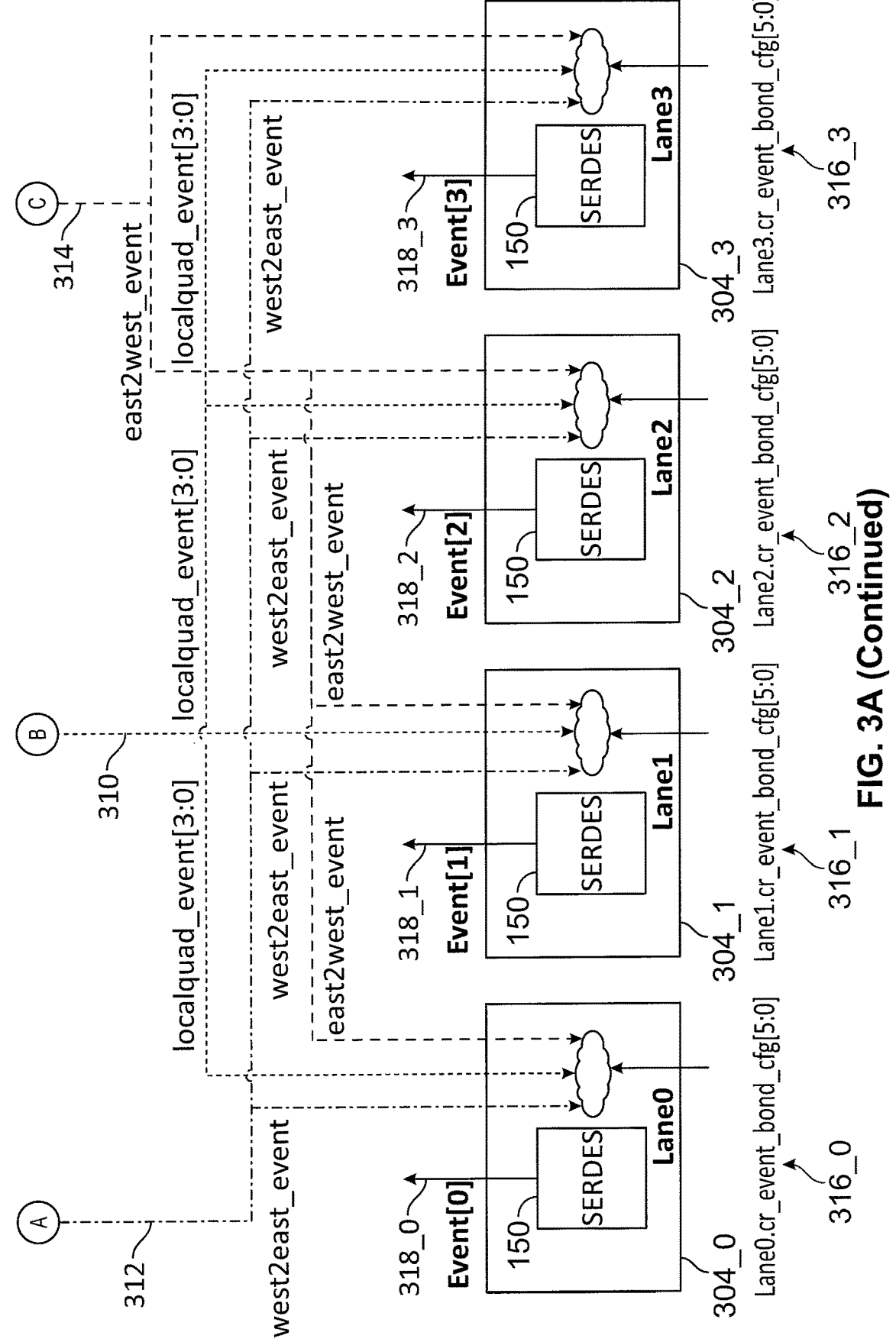
Figure 3B:
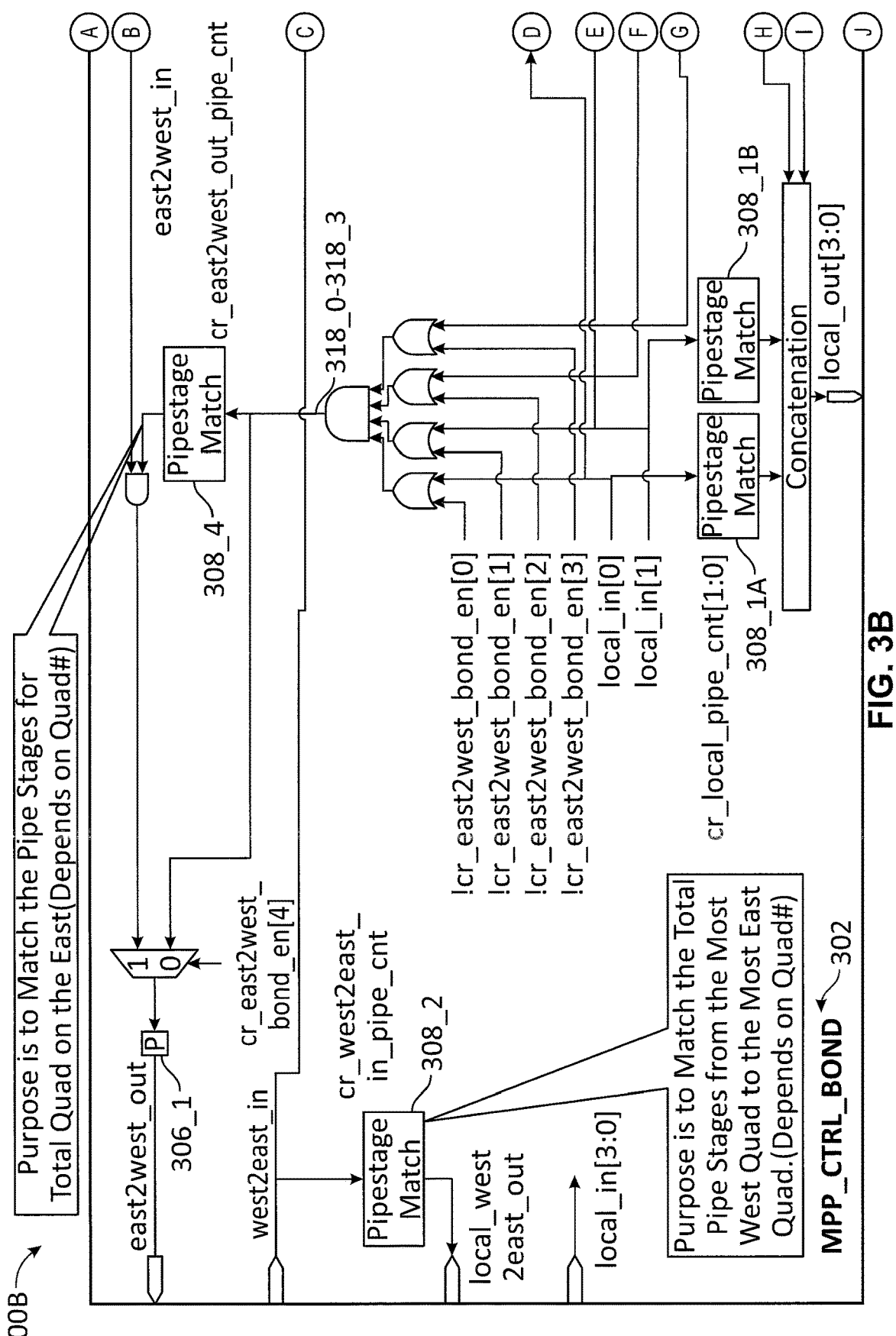
FIG. 3B illustrates a diagram of a lane bonding control module, according to some embodiments.

Signals may travel between different SerDes lanes within each configured group. To bond a set of signals from each participating SerDes lane in the group, it is important to impose the same propagation delay to the control signals from each SerDes lane in the group to other SerDes lanes in the group. To bond the signals in the group, each SerDes quad 202 may include a lane bonding control module. FIGS. 3A-B illustrate block diagrams 300A-B of a SerDes quad 202, according to some embodiments. SerDes quad 202 illustrated in FIG. 3A may be referred to as a local SerDes quad 202L. As discussed in FIGS. 2A and 2B, SerDes quads 202 may bound with other SerDes quads, which may be referred to as neighboring SerDes quads 202 (not shown). The SerDes quads to the left of the local SerDes 202L may be referred to as west SerDes quad(s) 202 and SerDes to the right of the local SerDes 202L may be referred to as east SerDes quad(s) 202.

FIG. 3A illustrates SerDes quad 202L that includes a lane bonding control module 302. Lane bonding control module 302 receives and transmits signals to and from SerDes lanes 304, such as SerDes lanes 304_0, 304_1, 304_2, and 304_3. The signals may be from SerDes lanes 304 within SerDes quads 202L and from neighboring SerDes quads 202, to an extent SerDes quad 202L is communicatively coupled to neighboring SerDes quad(s) 202.

To synchronize the timing of the signals, lane bonding control module 302 includes pipe stage flops, or simply flops 306, and pipe stage match modules 308. FIG. 3A illustrates an embodiment with flops 306_1 and 306_2 and pipe stage match modules 308_1-308_5.

Flops 306_1 and 306_2 may control timing of signals, including control signals, that SerDes quad 202L may receive from neighboring SerDes quads 202 by instituting a fixed timing delay. Controlling timing using flops 306_1 and/or 306_2 may introduce a fixed timing delay to signals travelling within SerDes quad 202L, from SerDes quad 202L to neighboring SerDes quads 202 and from neighboring SerDes quads 202 to SerDes quad 202L (not shown). In some embodiments, flop 306_1 may control the timing of the signals that are transmitted from or through SerDes quad 202L in one direction, e.g., east to west in FIG. 3A, and flop 306_2 may control timing of the signals that are transmitted from or though SerDes quad 202L in the second direction, e.g., west to east in FIG. 3A.

Pipe stage match modules 308_1-308_5 may match the propagation delays to the signals traveling within SerDes quad 202L, from SerDes quad 202L to the neighboring SerDes quads 202, and from the neighboring SerDes quads 202 to SerDes quad 202L. For example, the timing delay of signals traveling between two SerDes quads 202 may be set to one clock period due to passing through one flop 306, while the timing delay of signals traveling through three SerDes quads 202 may be set to two clock periods due to passing through two flops 306. To match the propagation delay of the signals, pipe stage match modules 308_1-308_5 may introduce a variable time delay. The variable time delay may match the number of flops 306 through which the signal passes.

In some instances, there may be multiple instances of pipe stage match modules 308_1, such that each pipe stage match module 308_1 corresponds to SerDes lane 304. As shown in FIG. 3A there may be four pipe stage match modules 308_1A-D corresponding to SerDes lanes 304_0-304_3 in local SerDes quad 202L, such that pipe stage match module 308_1A may apply to signals received by SerDes lane 304_0, pipe stage match module 308_1B may apply to signals received by SerDes lane 304_1, pipe stage match module 308_1C may apply to signals received by SerDes lane 304_2, and pipe stage match module 308_1D may apply to signals received by SerDes lane 304_3. Pipe stage match modules 308_1A-D may match the propagation delay caused by flops 306 to signals travelling from the most west SerDes quad 202 to the most east SerDes quad 202 in the configurable group. The variable timing delay from pipe stage match modules 308_1A-D may be the same for all SerDes quads 202 in the configurable group.

Pipe stage match module 308_2 may apply to signals, e.g., control signals, that the local SerDes quad 202L receives from the west neighboring SerDes quad 202. Pipe stage match module 308_2 may match the signal delay from the west neighboring SerDes quad 202 and is meant to match the delay due to the total number of flops 306 added from the most west SerDes quad 202 to the most east SerDes quad 202. The propagation delay of pipe stage match module 308_2 may vary depending on the location of the local SerDes quad 202L in the group of multiple SerDes quads 202.

Pipe stage match module 308_3 may apply to signals, e.g., control signals, that local SerDes quad 202L receives from the east neighboring SerDes quad 202. Pipe stage match module 308_3 may match the signal delay from the east SerDes quad 202 and may match the delay from the total number of flops 306 added from the most west SerDes quad 202 to the most east SerDes quad 202. The propagation delay may vary depending on the location of the local SerDes quad 202.

Pipe stage match module 308_4 may apply to signals, e.g., control signals, to the west SerDes quad 202. Pipe stage match module 308_4 may match the signal delay to the west SerDes quad 202 and may match the delay added by the total number of flops 306 from the east SerDes quad 202. The propagation delay of pipe stage module 308_3 may vary depending on the location of the local SerDes quad 202L.

Pipe stage match module 308_5 may apply to signals, e.g., control signals, to the east SerDes quad 202. Pipe stage match module 308_5 may match the signal delay to the east SerDes quad 202 and may match the delay added by the total number of flops 306 from the west SerDes quad 202. The propagation delay may vary depending on the location of the local SerDes quads 202L.

Pipe stage match modules 308_0-308_5 may be associated with configuration registers. The configuration registers may indicate where the signals are coming from or where the signals are going to. Depending on where the signals are coming from or going to, pipe stage match modules 308_0-308_5 may match a propagation delay of the signals using a variable time delay.

In some embodiments, each SerDes lane 304_0-304_3 in SerDes quad 202L may be associated with configuration registers. Configuration registers may be associated with processing signals 310, 312, 314, and 316, and may be set depending on the SerDes quad 202L and the configuration group that includes one or more SerDes lanes 304_0-304_3 in SerDes quad 202L. Based on the configuration registers indicating which configuration group each SerDes lane 304_0-304_3 corresponds to, each SerDes lane 304_0-304_3 may or may not process control signals 310, 312, and 314. For example, configuration registers may identify whether signals 310, 312, and 314 may be processed by SerDes lanes 304_0-304_3. Configuration registers may determine whether to process local control signals 310 by one or more SerDes lanes 304_0-304_3 within the SerDes quad 202L. Local control signals 310 may pass through pipe stage match modules 308_1A-D. Configuration registers may also determine whether to process control signals 312 transmitted from neighboring SerDes quad(s) 202, such as west SerDes quad(s) 202 in relation to local SerDes quad 202L, and control signals 314 from neighboring SerDes quad(s) 202, such as the east SerDes quad(s) 202. Control signals 312 may pass through pipe stage match module 308_2 and control signals 314 may pass through pipe stage match module 308_3.

Configuration registers may indicate whether each SerDes lane 304_0-304_3 is grouped with other lanes in the local SerDes quad 202L and/or with SerDes lanes in neighboring SerDes quads 202. For example, the configuration registers may set control signals 316_0-316_3 corresponding to respective SerDes lanes 304_0-304_3 in SerDes quad 202L that may indicate the configuration group or groups that include the corresponding SerDes lanes 304_0-304_3.

In some embodiments, SerDes lanes 304_0-304_3 may transmit control signals 318_0-318_3. The control signals 318_0-318_3 may be combined with the control signals from neighboring SerDes quad(s) 202 for transmission to the neighboring SerDes quad(s) 202. For example, control signals 318_0-318_3 from the local SerDes quad 202L may be combined with control signals from the west SerDes quad(s) 202 for transmission to the east SerDes quad(s) 202 with a propagation delay set by flop 306_1 and pipe stage match module 308_4. In another example, control signals 318_0-318_3 from the local SerDes quad 202L may be combined with control signals from the east SerDes quad(s) 202 for transmission to the west SerDes quad(s) 202 with a propagation delay set by flop 306_2 and pipe stage match module 308_5.

In some embodiments, lane bonding control module 302 may also include ports 320A-D. Ports 320A and 320B may be input ports. Port 320A may receive signals from west SerDes quad 202 and port 320B may receive control signals from east SerDes quad 202 in relation to local SerDes quad 202L. Ports 320C and 320D may be output ports. Port 320C may transmit signals to west SerDes quad 202 and port 320D may transmit control signals to east SerDes quad 202 from local SerDes quad 202L.

FIG. 3B is a block diagram 300B of a lane bonding control module 302, according to some embodiments. FIG. 3B further illustrates a circuitry corresponding to the pipe stage match modules 308_1-308_5 and flops 306_1-306_2. FIG. 3B also illustrates the circuitry for control signals 318_0-318_3.

Figure 4A:
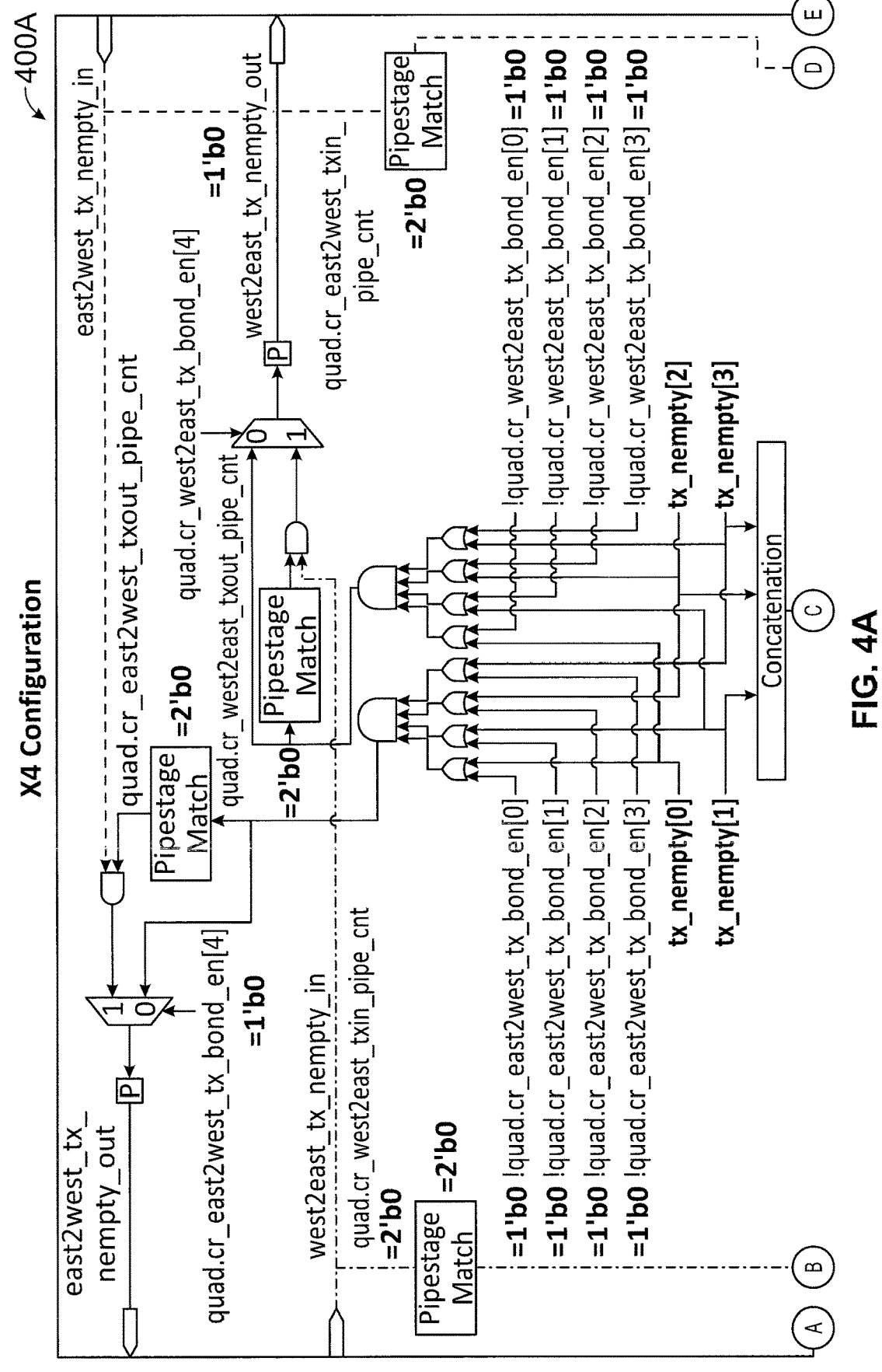
FIGS. 4A-C illustrate diagrams of various group configurations in a SerDes quad, according to dome embodiments.
Figure 4A:
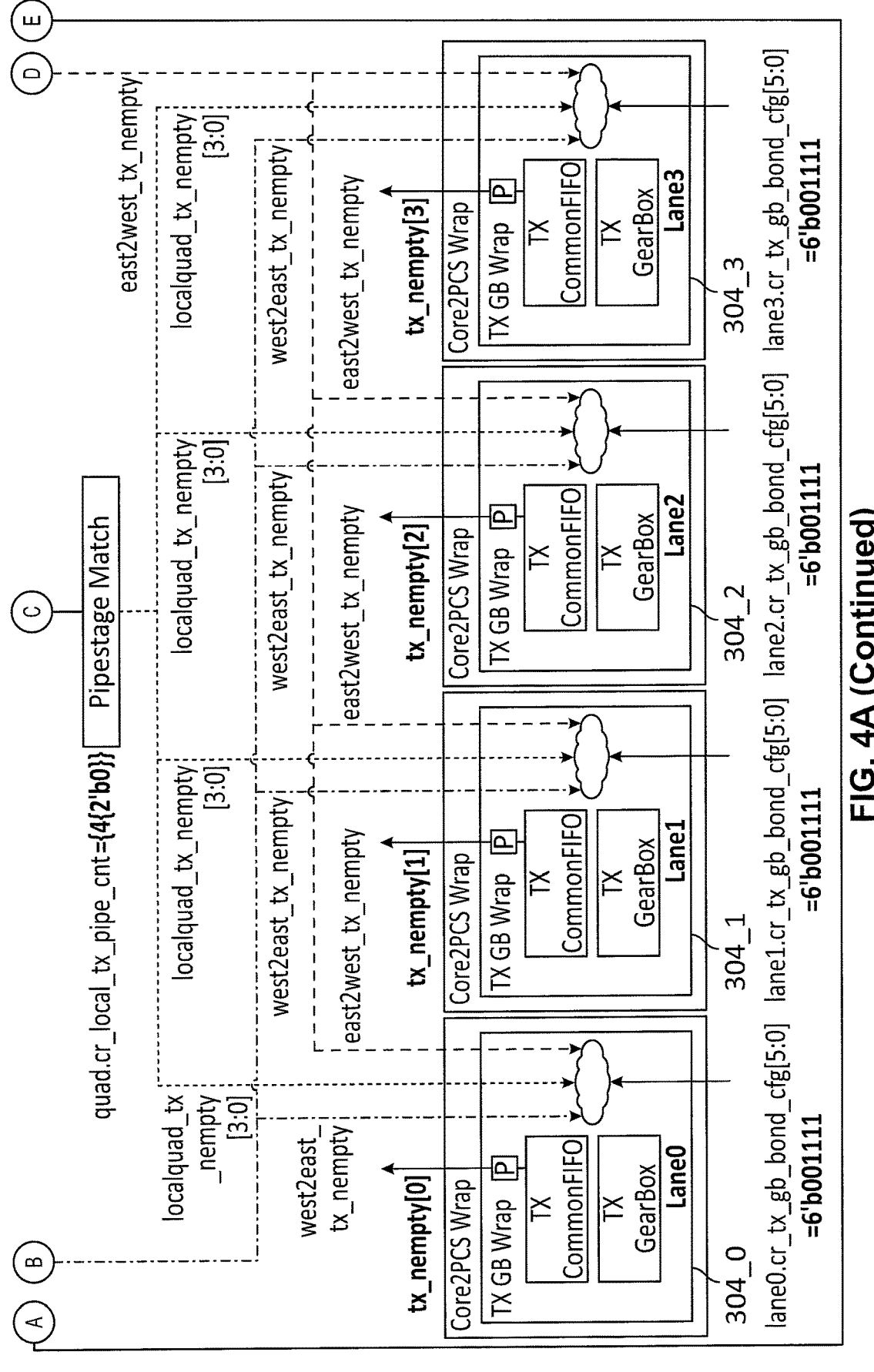
Figure 4B:
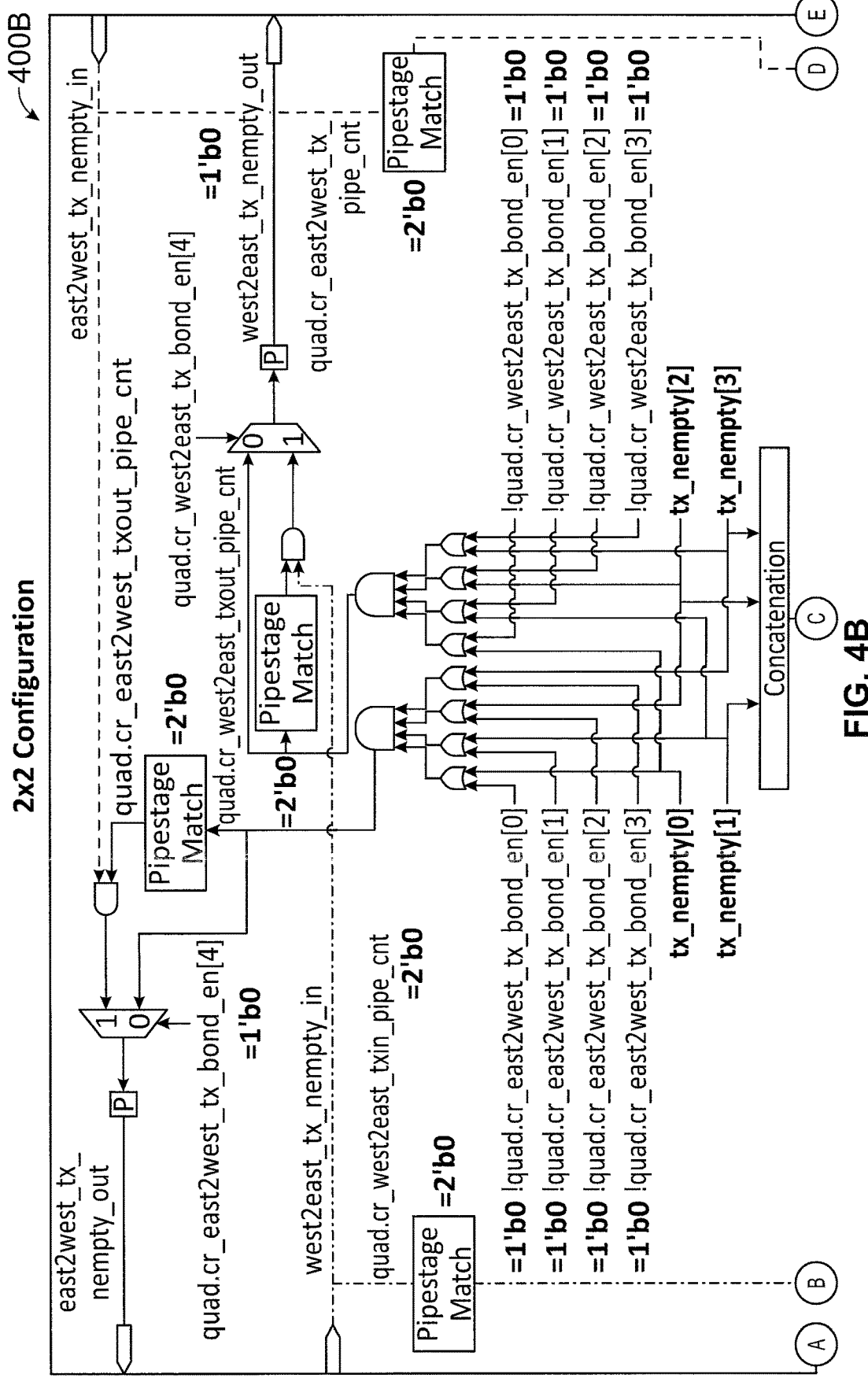
Figure 4B:
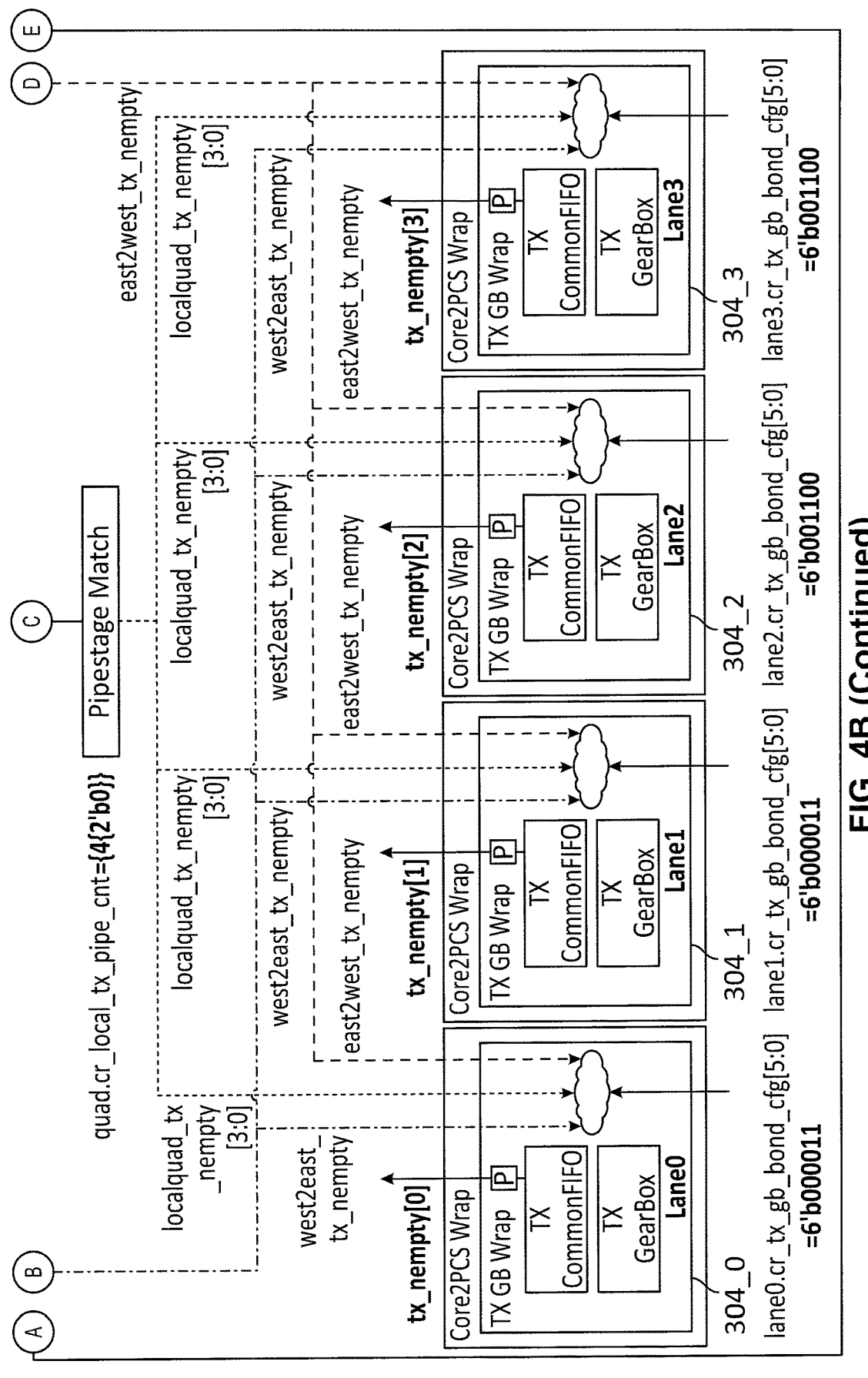
Figure 4C:
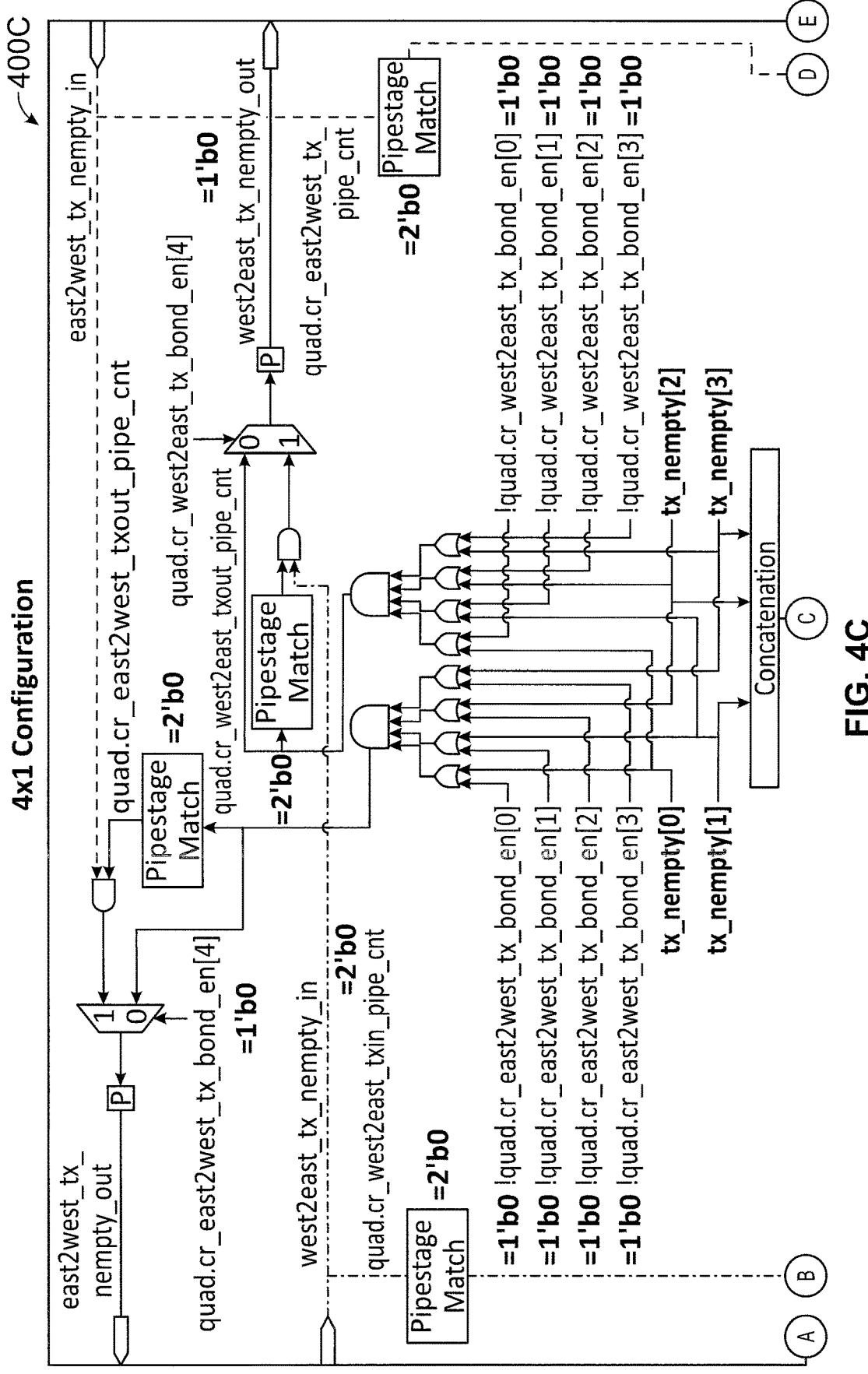
Figure 4C:
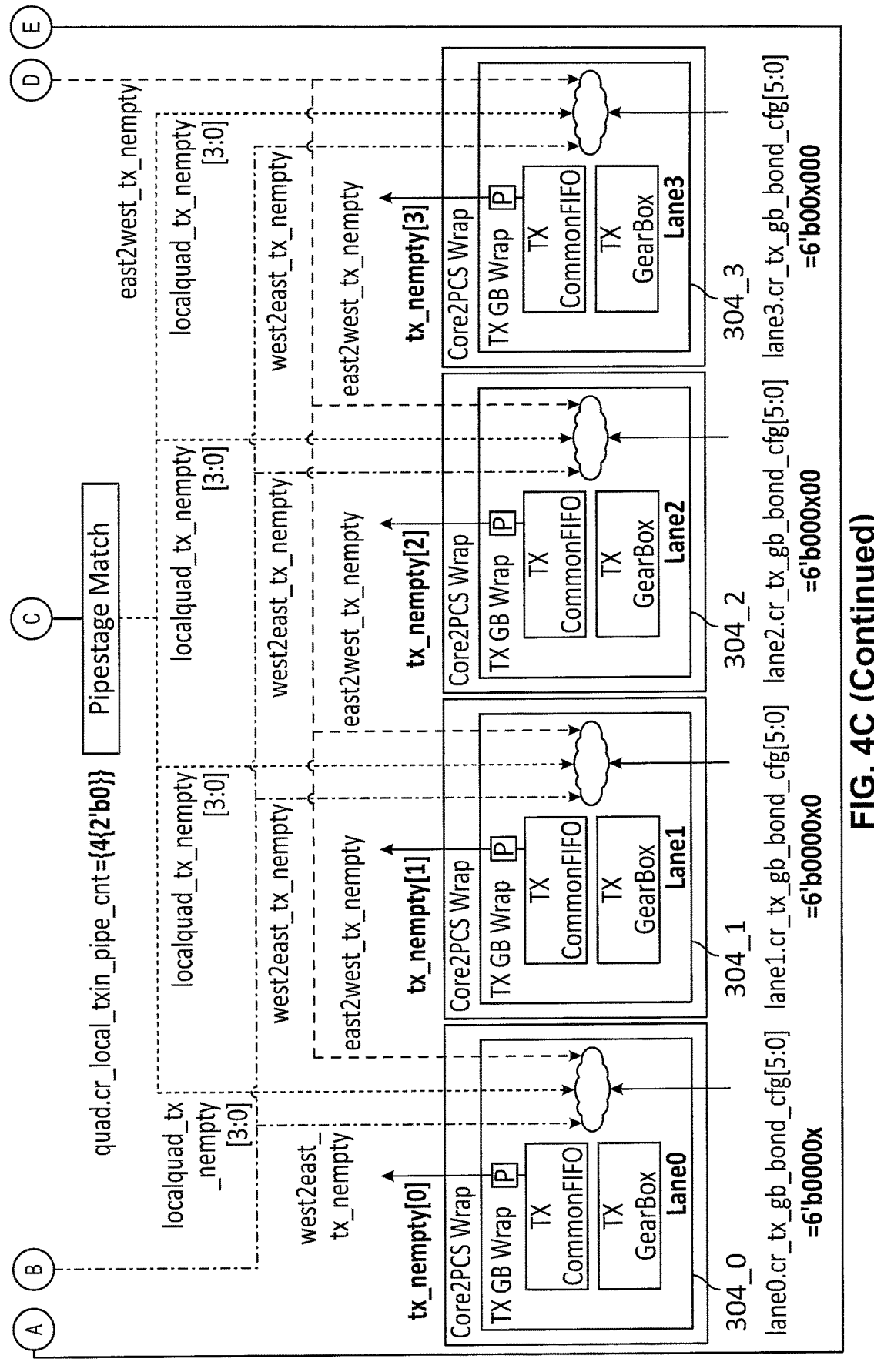

FIGS. 4A-C are diagrams 400A-C of various group configurations in a SerDes quad, according to dome embodiments. FIG. 4A illustrates SerDes quad 202 having a 1×4 link configuration where SerDes lanes 304_0-304_3 are bonded into a single group. The example register configuration for flops 306, pipe stage match modules 308, and SerDes lanes 304_0-304_3 for the 1×4 link configuration may be as follows:

| Quad 202 Register Configuration | Register Value |
|---|---|
| lane0.cr_tx_gb_bond_cfg | 6'b001111 |
| lane1.cr_tx_gb_bond_cfg | 6'b001111 |
| lane2.cr_tx_gb_bond_cfg | 6'b001111 |
| lane3.cr_tx_gb_bond_cfg | 6'b001111 |
| quad.cr_east2west_tx_bond_en | 5'b00000 |
| quad.cr_east2west_txout_pipe_cnt | 2'b00 |
| quad.cr_east2west_txin_pipe_cnt | 2'b00 |
| quad.cr_west2east_tx_bond_en | 5'b00000 |
| quad.cr_west2east_txout_pipe_cnt | 2'b00 |
| quad.cr_west2east_txin_pipe_cnt | 2'b00 |
| quad.cr_local_tx_pipe_cnt | 8'b00000000 |

FIG. 4B illustrates SerDes quad 202 having a 2×2 link configuration where SerDes lanes 304_0-304_1 are bonded into a first group and SerDes lanes 304_2-304_3 are bonded into a second group. The example register configuration for flops 306, pipe stage match modules 308, and SerDes lanes 304_0-304_3 for the 2×2 link configuration may be as follows:

| Quad 202 Register Configuration | Register Value |
|---|---|
| lane0.cr_tx_gb_bond_cfg | 6'b000011 |
| lane1.cr_tx_gb_bond_cfg | 6'b000011 |
| lane2.cr_tx_gb_bond_cfg | 6'b001100 |
| lane3.cr_tx_gb_bond_cfg | 6'b001100 |
| quad.cr_east2west_tx_bond_en | 5'b00000 |
| quad.cr_east2west_txout_pipe_cnt | 2'b00 |
| quad.cr_east2west_txin_pipe_cnt | 2'b00 |
| quad.cr_west2east_tx_bond_en | 5'b00000 |
| quad.cr_west2east_txout_pipe_cnt | 2'b00 |
| quad.cr_west2east_txin_pipe_cnt | 2'b00 |
| quad.cr_local_tx_pipe_cnt | 8'b00000000 |

8

FIG. 4C illustrates SerDes quad 202 having a 4×1 link configuration where SerDes lanes 304_0-304_3 are not bonded and operate independently of each other. The example register configuration for the 2×2 link configuration may be as follows:

| Quad 202 Register Configuration | Register Value |
|---|---|
| lane0.cr_tx_gb_bond_cfg | 6'b000001 |
| lane1.cr_tx_gb_bond_cfg | 6'b000010 |
| lane2.cr_tx_gb_bond_cfg | 6'b000100 |
| lane3.cr_tx_gb_bond_cfg | 6'b001000 |
| quad.cr_east2west_tx_bond_en | 5'b00000 |
| quad.cr_east2west_txout_pipe_cnt | 2'b00 |
| quad.cr_east2west_txin_pipe_cnt | 2'b00 |
| quad.cr_west2east_tx_bond_en | 5'b00000 |
| quad.cr_west2east_txout_pipe_cnt | 2'b00 |
| quad.cr_west2east_txin_pipe_cnt | 2'b00 |
| quad.cr_local_tx_pipe_cnt | 8'b00000000 |

Figure 5A:
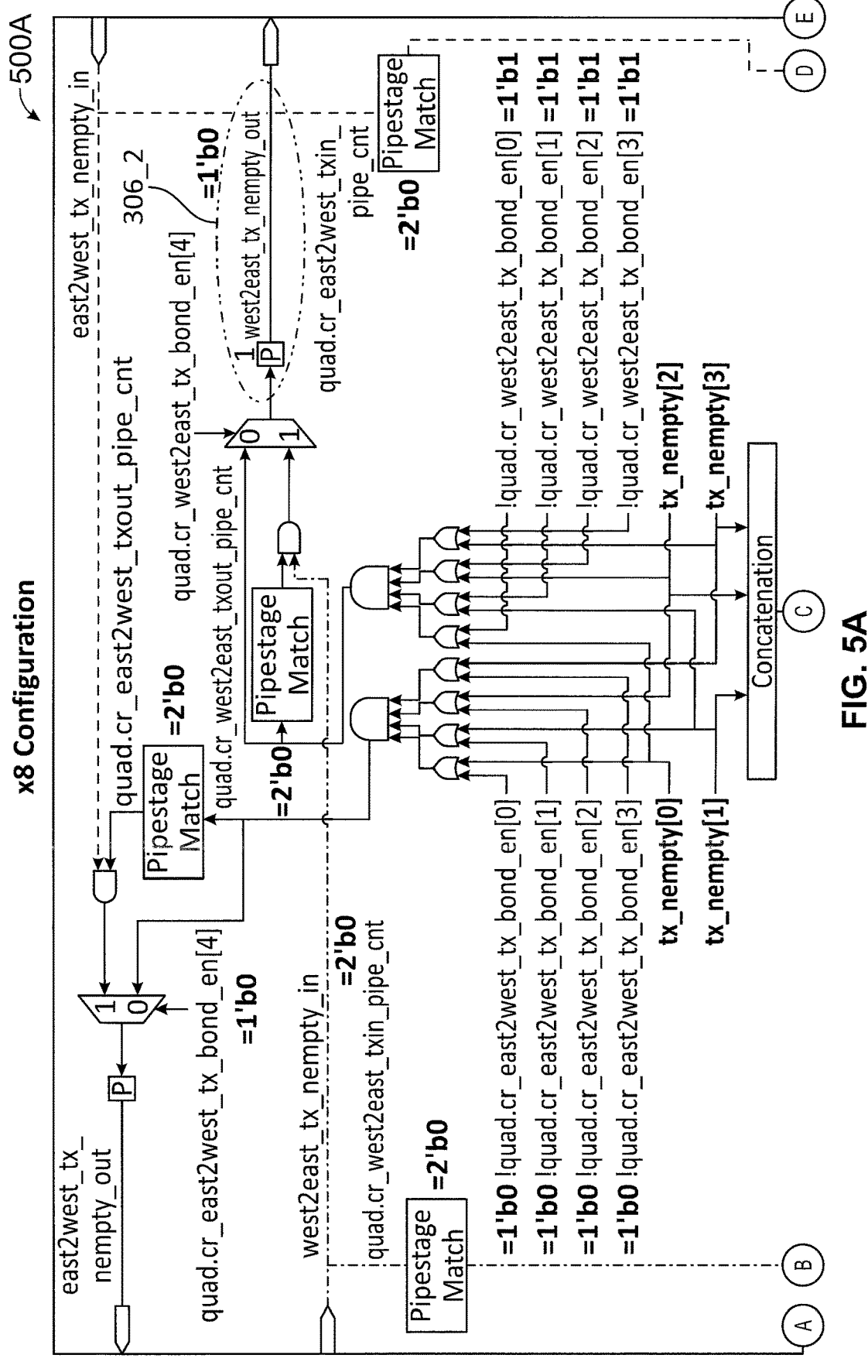
FIGS. 5A-C illustrates diagrams of various group configurations in two SerDes quads, according to dome embodiments.
Figure 5A:
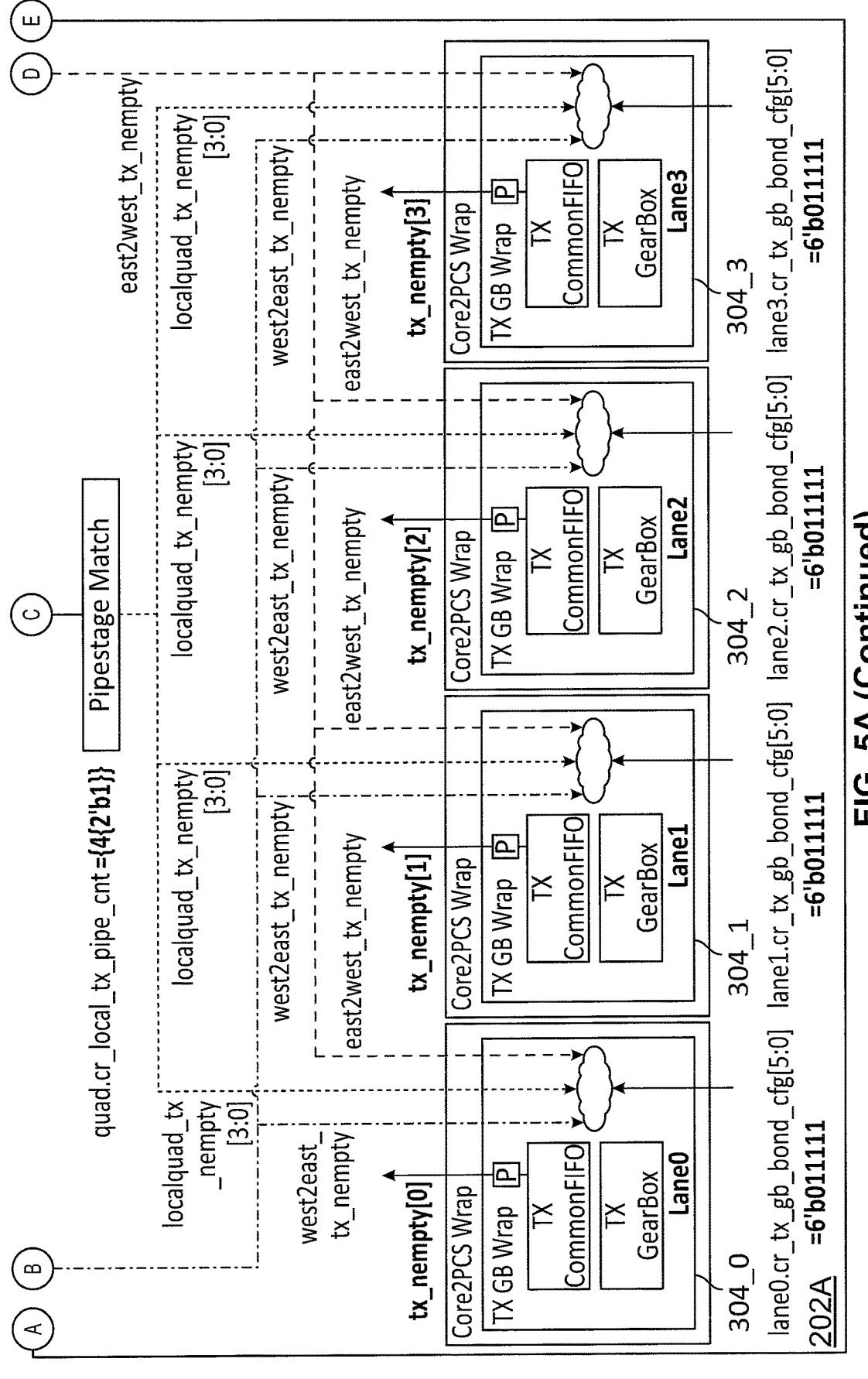
Figure 5A:
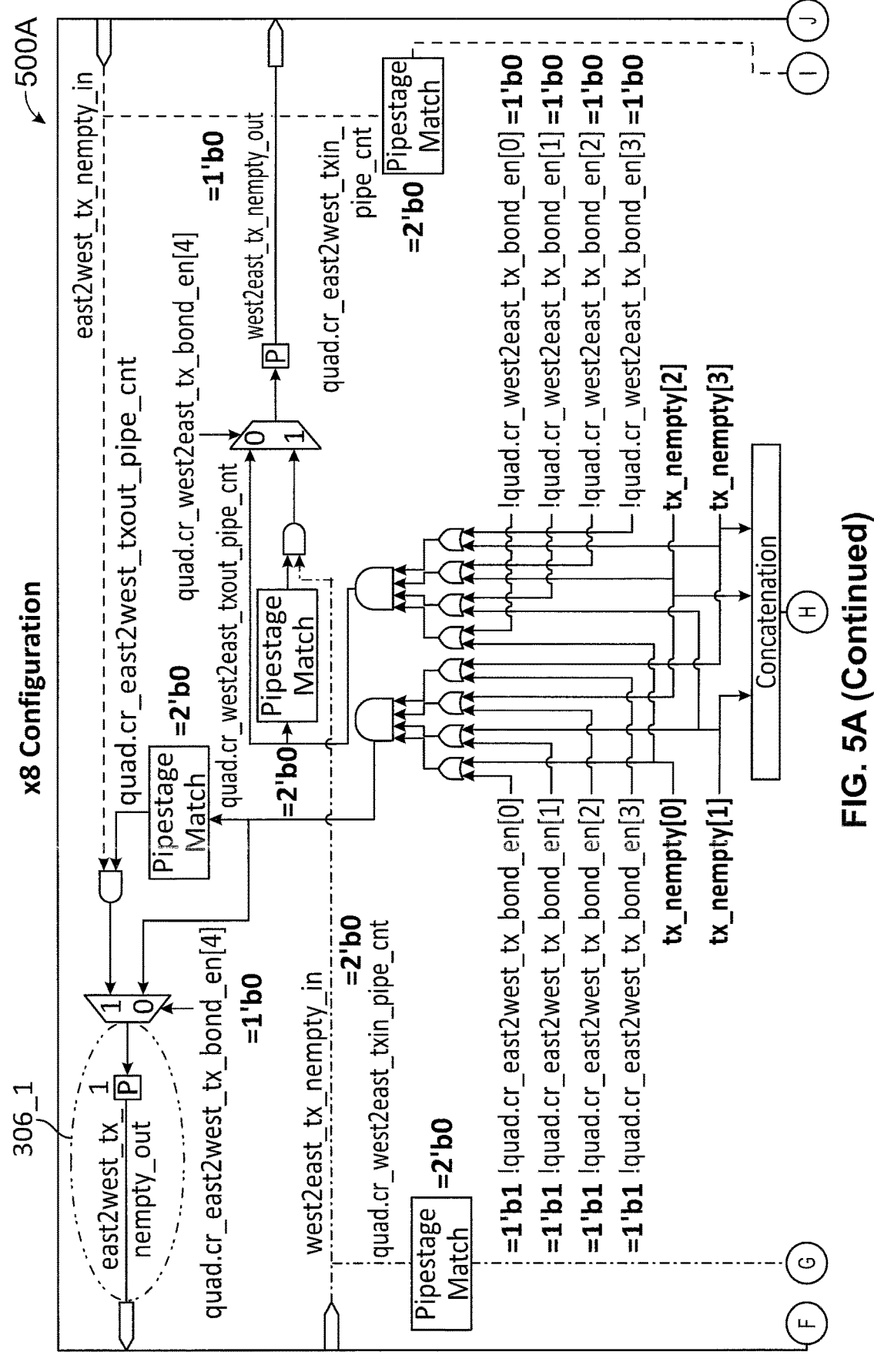
Figure 5A:
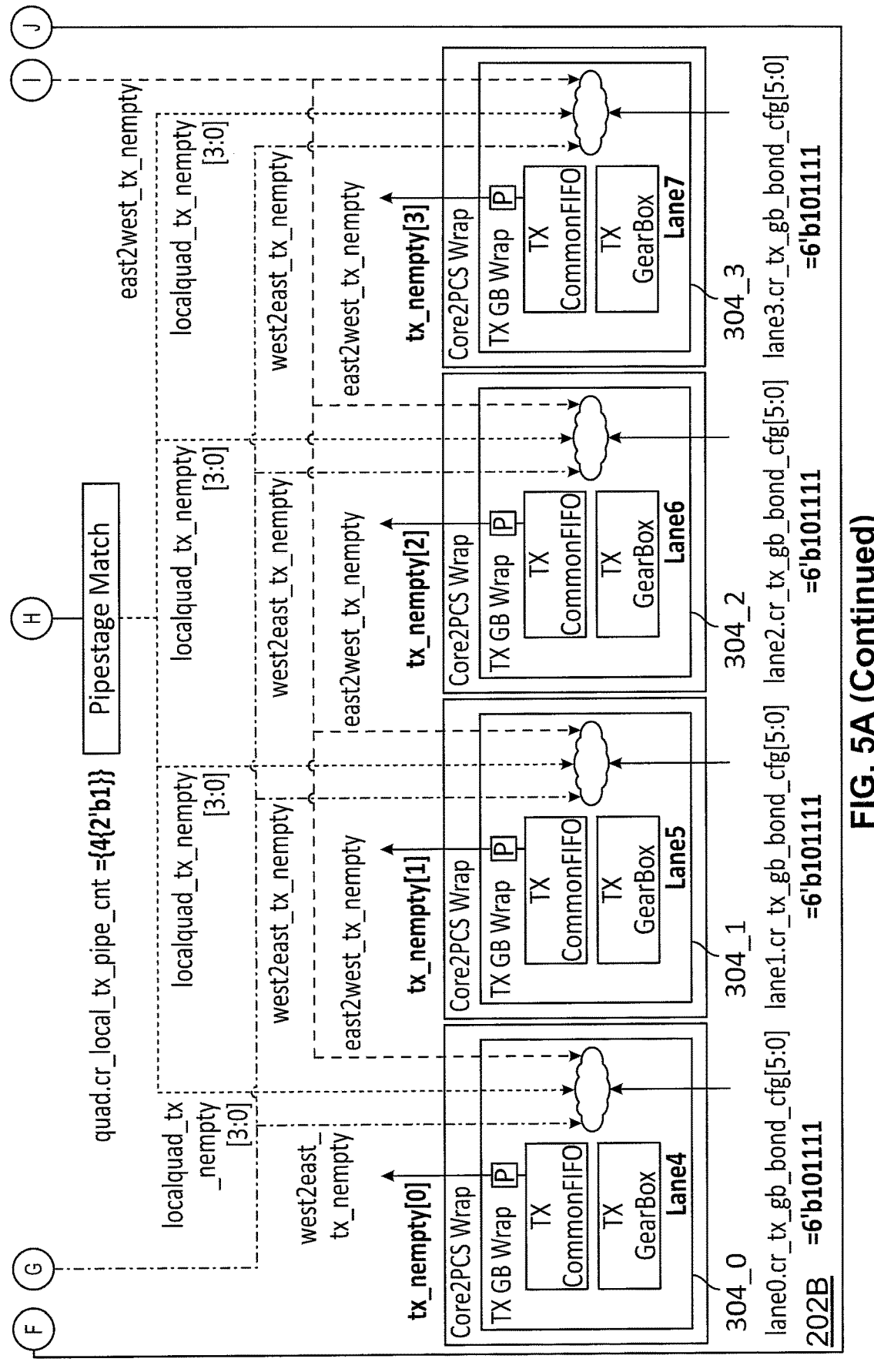
Figure 5B:
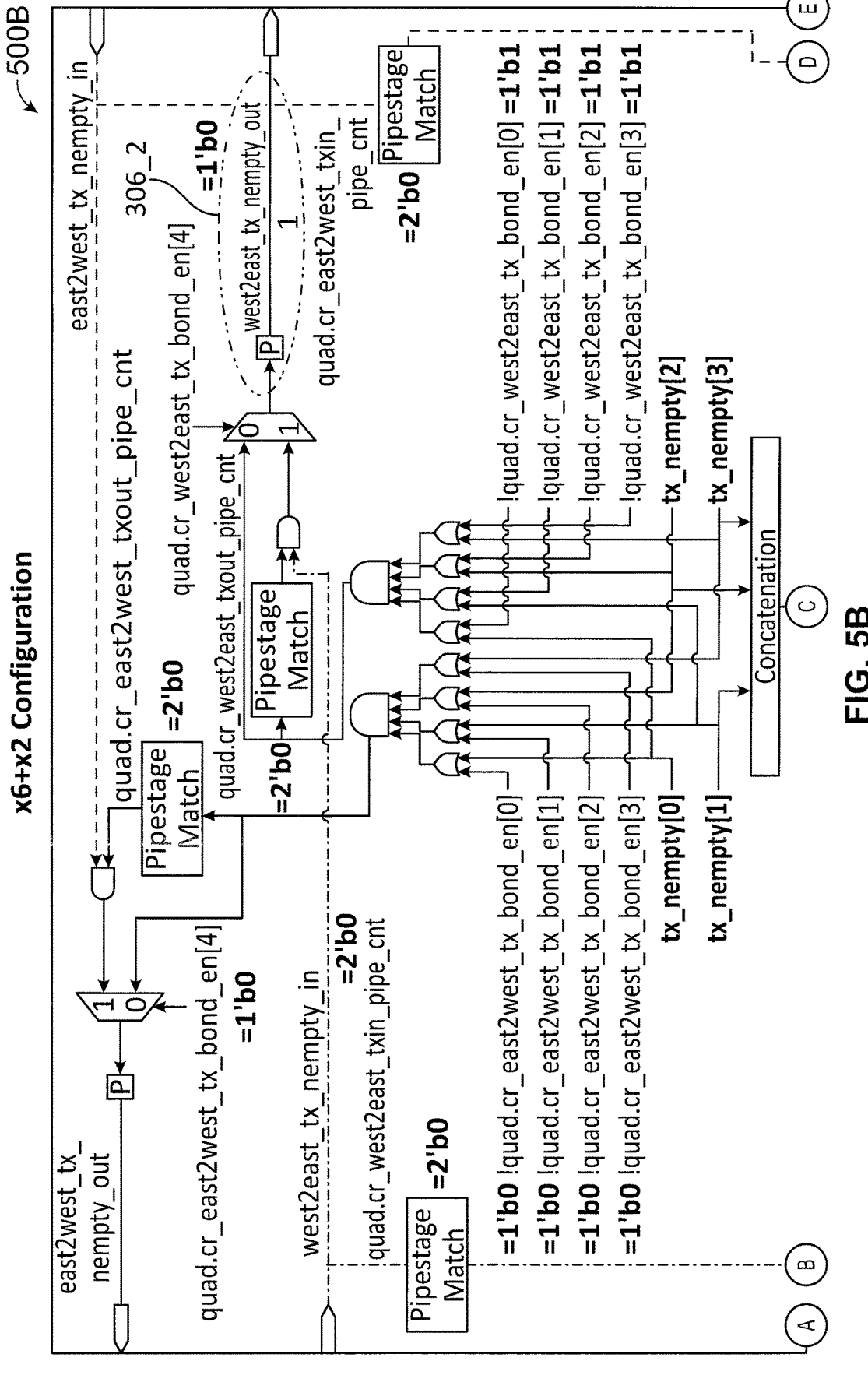
Figure 5B:
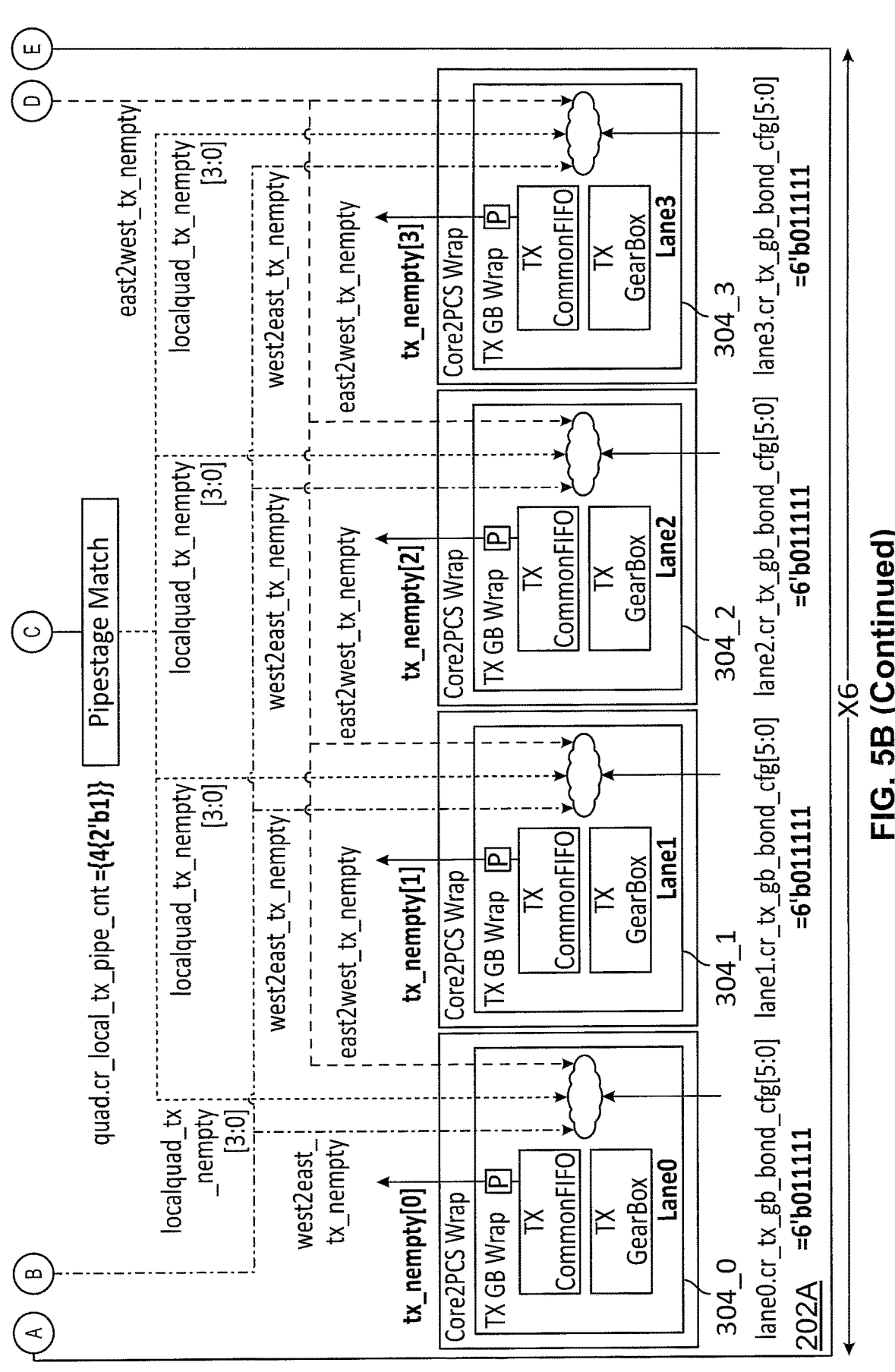
Figure 5B:
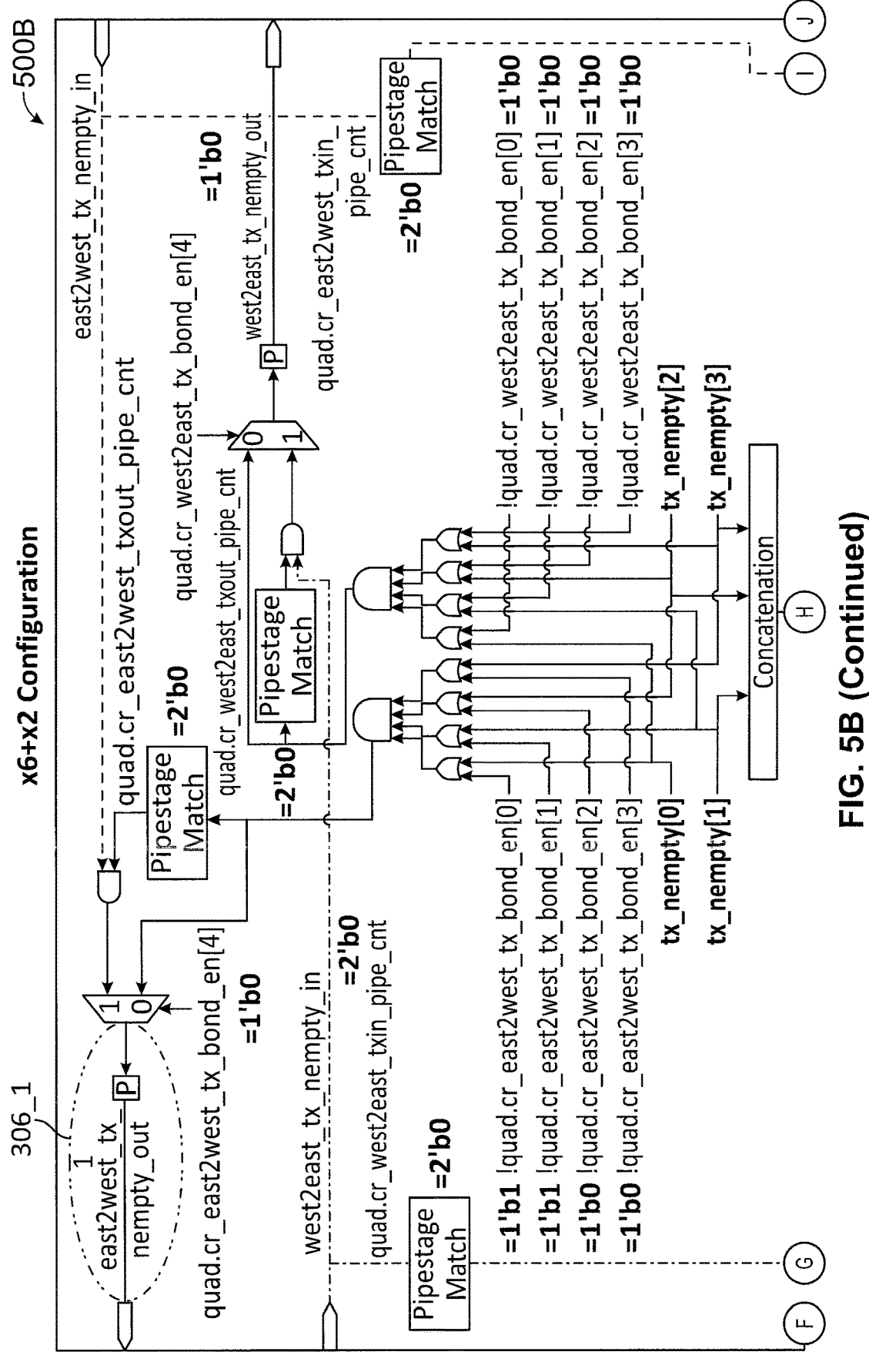
Figure 5B:
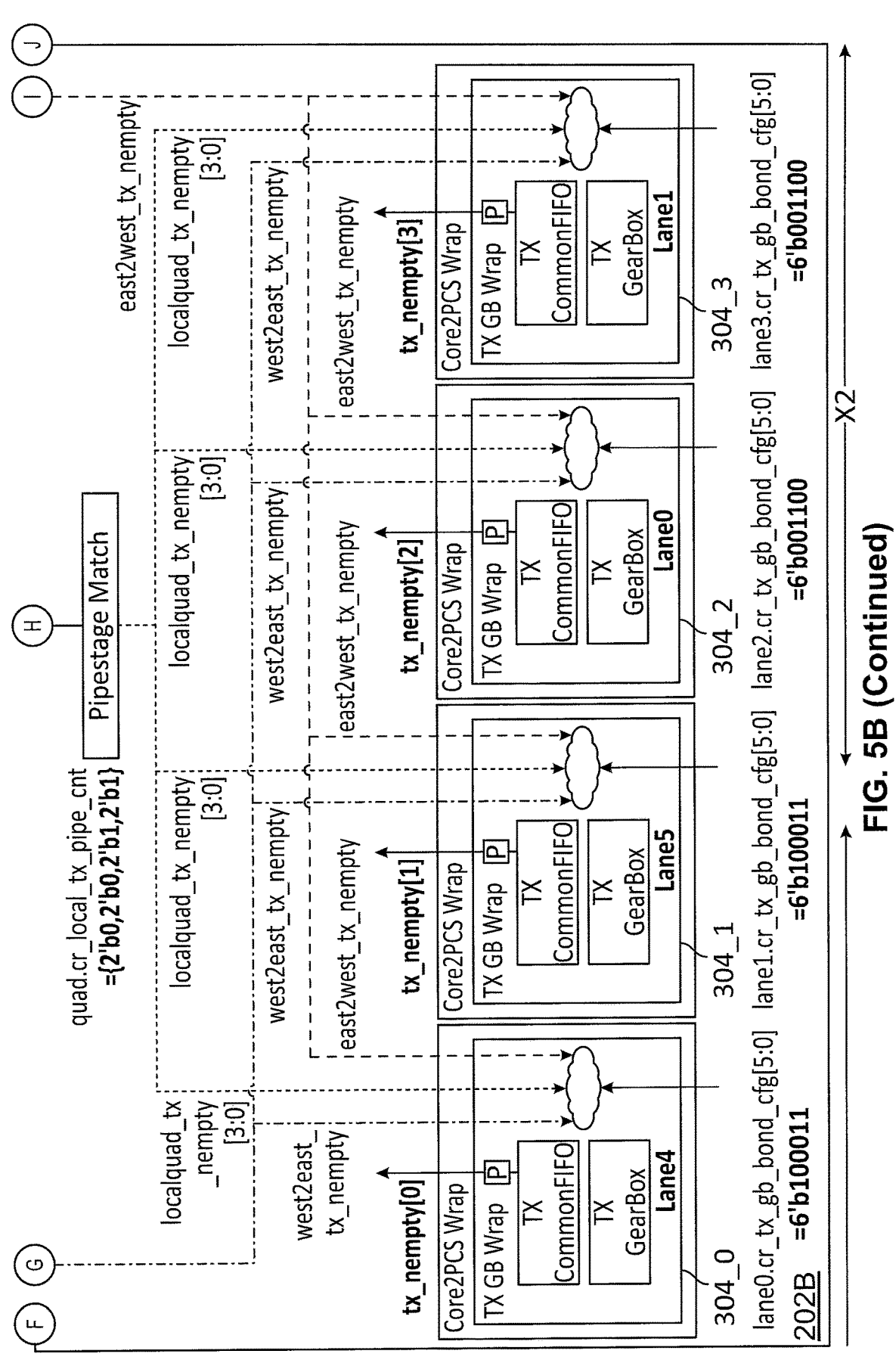
Figure 5C:
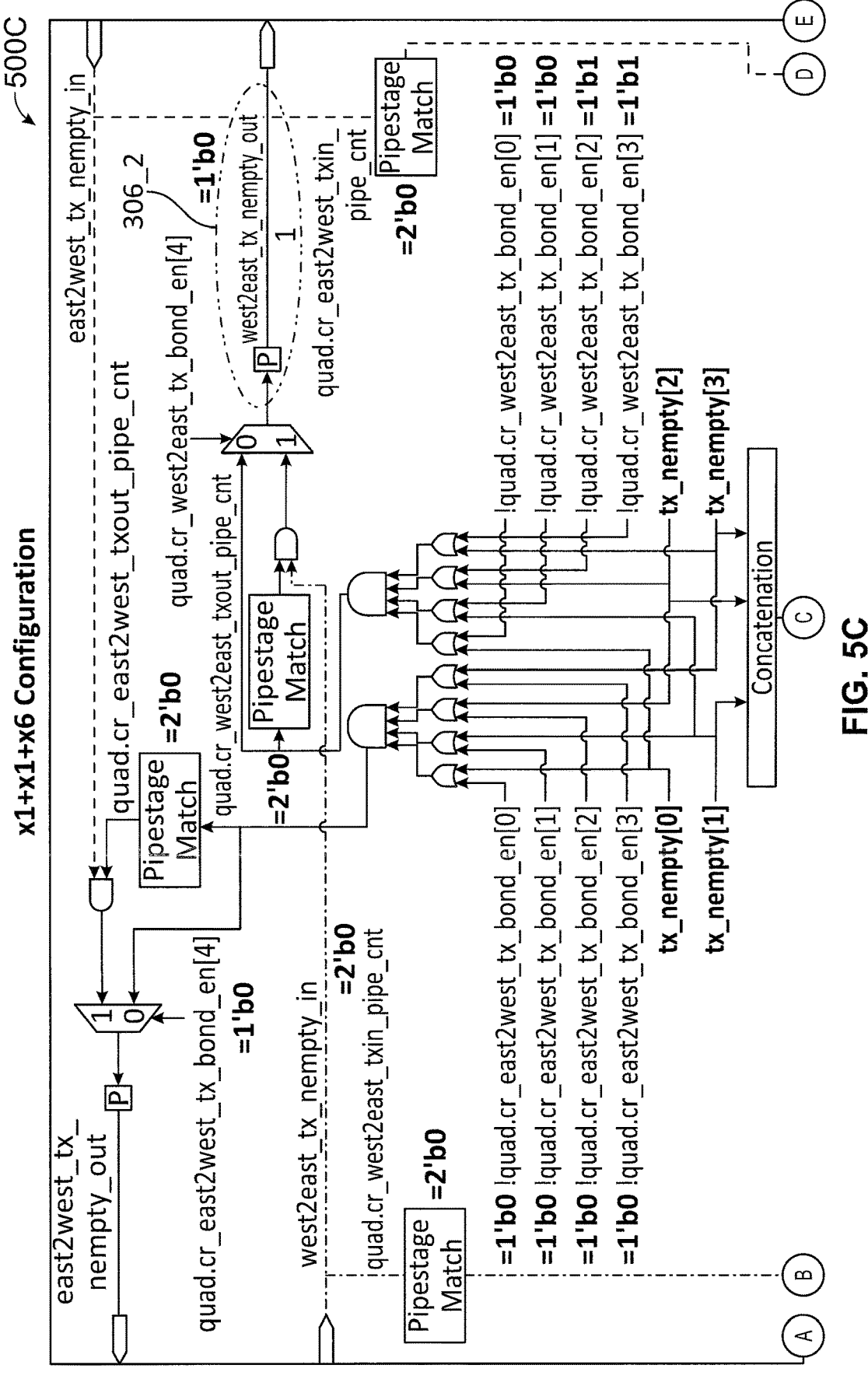
Figure 5C:
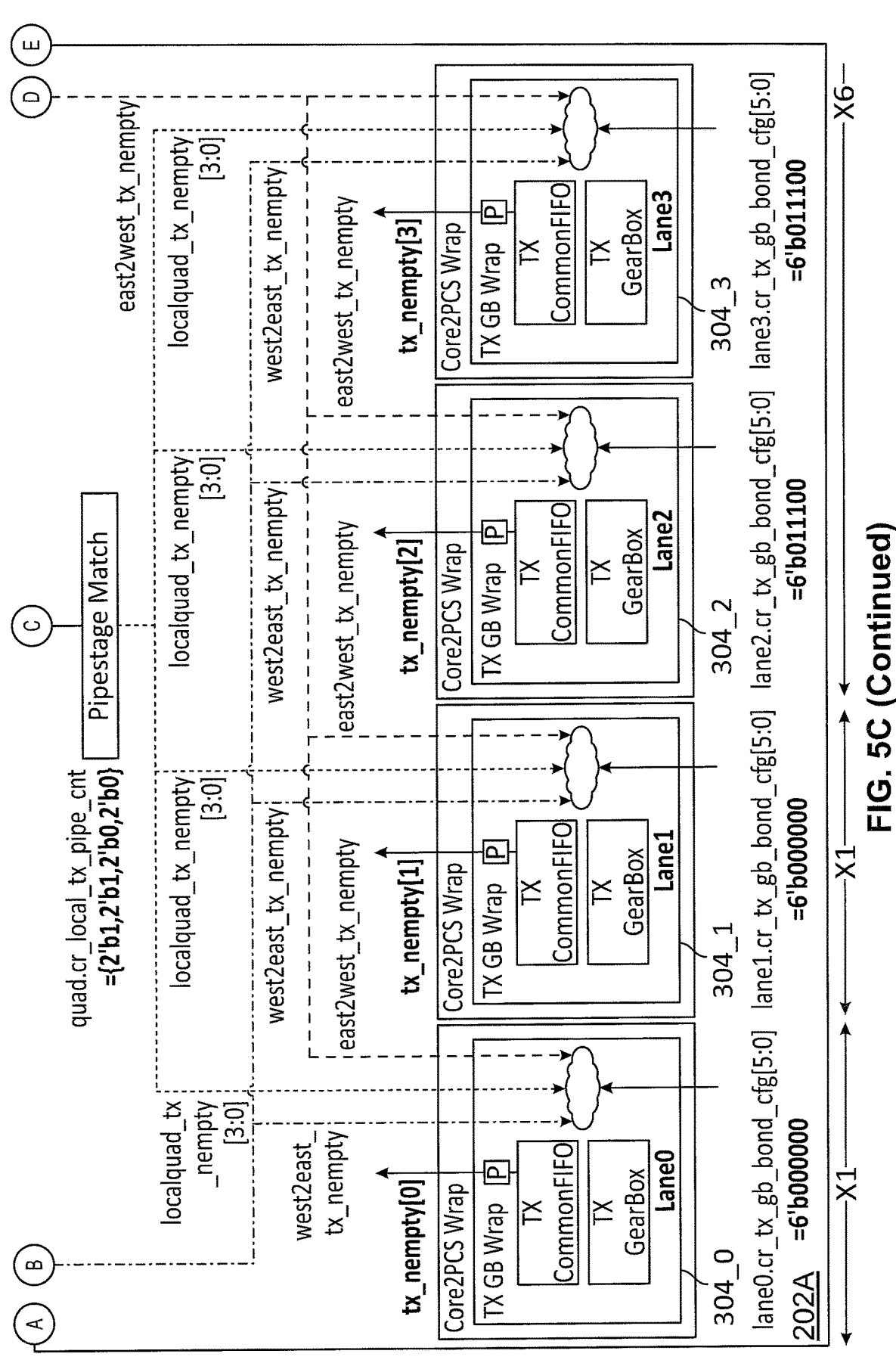
Figure 5C:
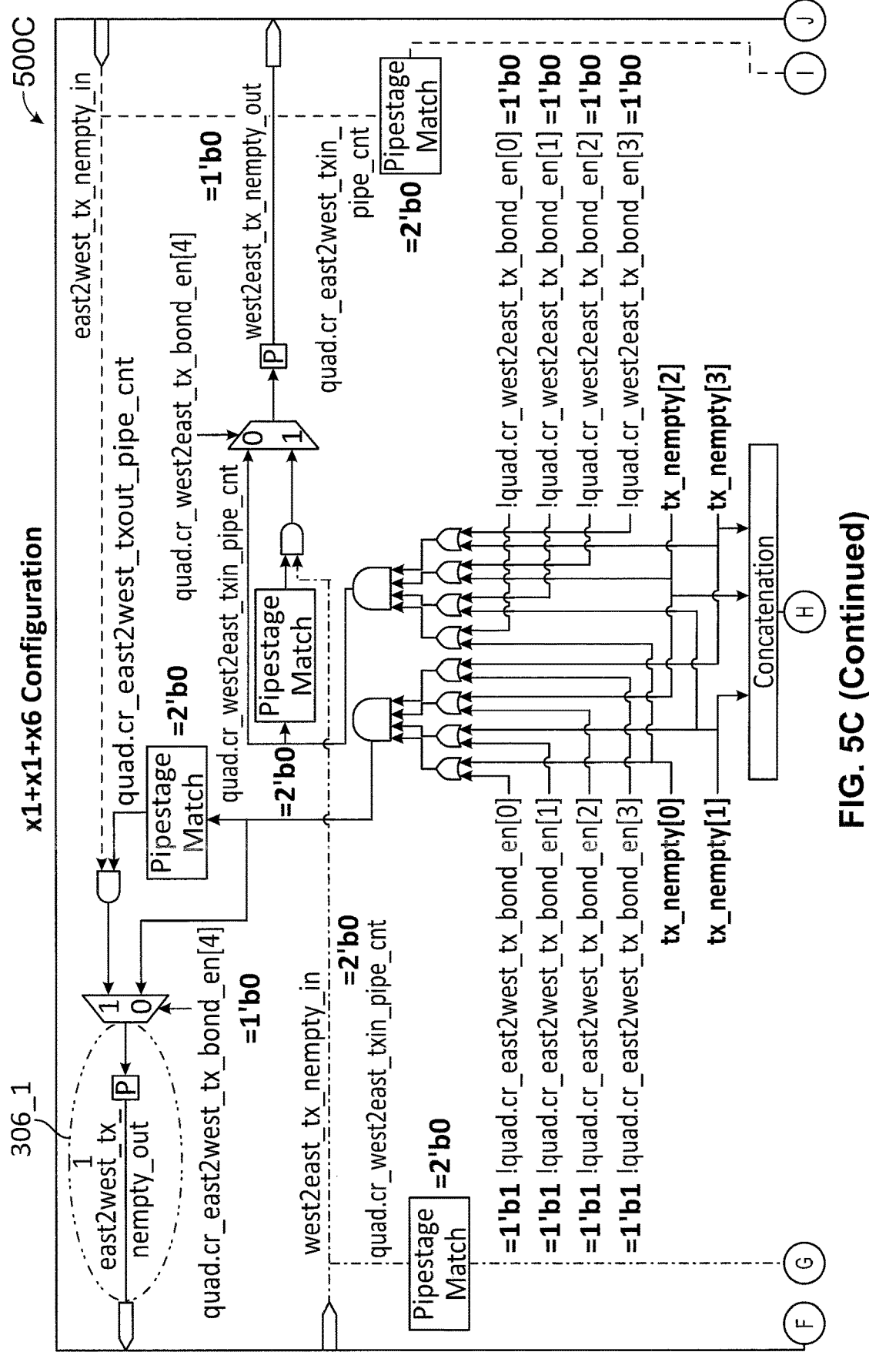
Figure 5C:
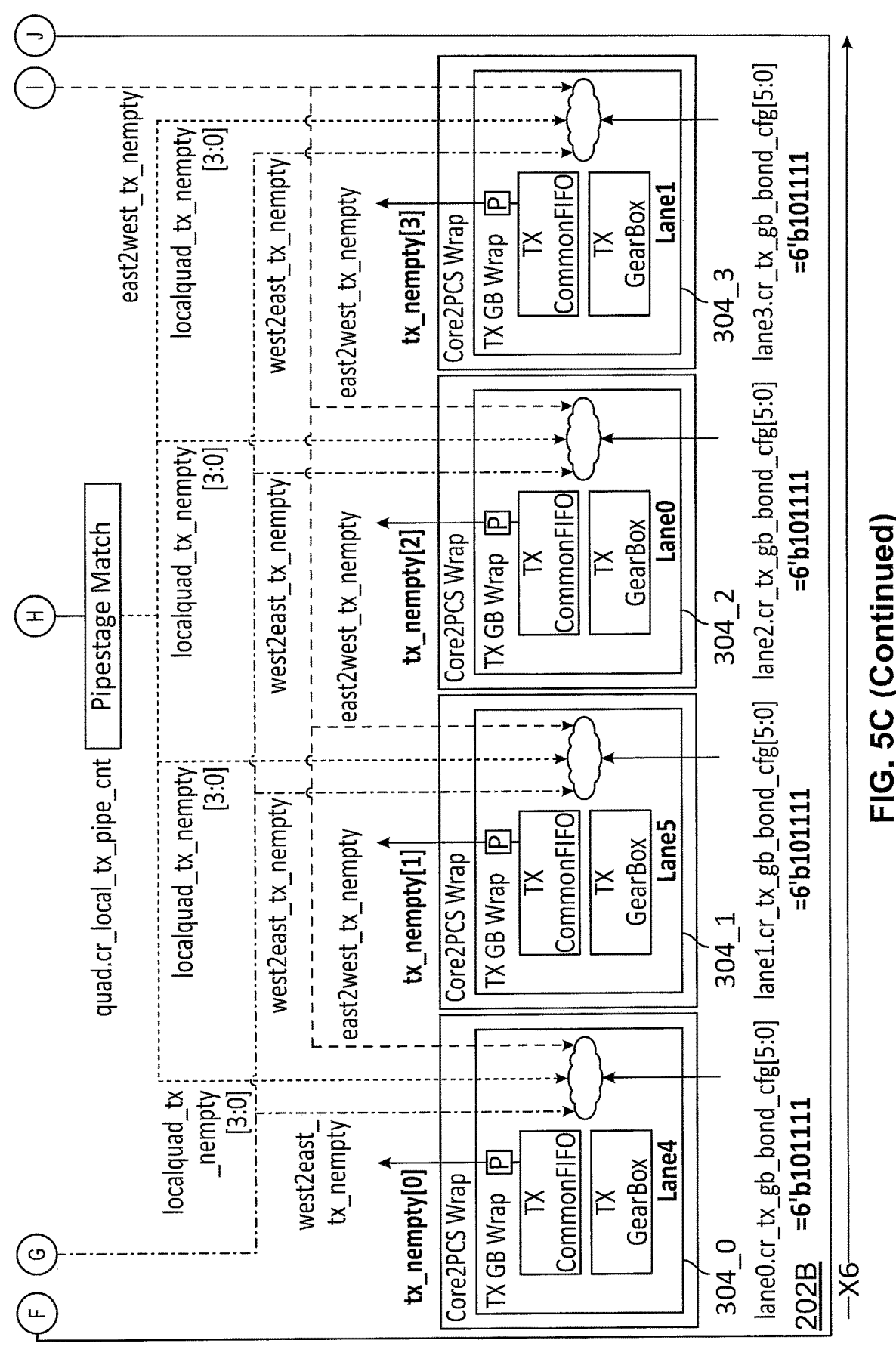

FIGS. 5A-C are diagrams 500A-C of various group configurations that may be configured using two SerDes quads, according to dome embodiments. FIG. 5A illustrates SerDes quad 202A and 202B in a 1×8 link configuration where SerDes lanes 304_0-304_3 of SerDes quad 202A and SerDes lanes 304_0-304_3 of SerDes quad 202B are bonded into a single group. The example register configuration for the 1×8 link configuration for may be as follows:

| | Register Value |
|---|---|
| Quad 202A Register | |
| lane0.cr_tx_gb_bond_cfg | 6'b011111 |
| lane1.cr_tx_gb_bond_cfg | 6'b011111 |
| lane2.cr_tx_gb_bond_cfg | 6'b011111 |
| lane3.cr_tx_gb_bond_cfg | 6'b011111 |
| quad.cr_east2west_tx_bond_en | 5'b00000 |
| quad.cr_east2west_txout_pipe_cnt | 2'b00 |
| quad.cr_east2west_txin_pipe_cnt | 2'b00 |
| quad.cr_west2east_tx_bond_en | 5'b01111 |
| quad.cr_west2east_txout_pipe_cnt | 2'b00 |
| quad.cr_west2east_txin_pipe_cnt | 2'b00 |
| quad.cr_local_tx_pipe_cnt | 8'b01010101 |
| Quad 202B Register | |
| lane0.cr_tx_gb_bond_cfg | 6'b101111 |
| lane1.cr_tx_gb_bond_cfg | 6'b101111 |
| lane2.cr_tx_gb_bond_cfg | 6'b101111 |
| lane3.cr_tx_gb_bond_cfg | 6'b101111 |
| quad.cr_east2west_tx_bond_en | 5'b01111 |
| quad.cr_east2west_txout_pipe_cnt | 2'b00 |
| quad.cr_east2west_txin_pipe_cnt | 2'b00 |
| quad.cr_west2east_tx_bond_en | 5'b00000 |
| quad.cr_west2east_txout_pipe_cnt | 2'b00 |
| quad.cr_west2east_txin_pipe_cnt | 2'b00 |
| quad.cr_local_tx_pipe_cnt | 8'b01010101 |

In this configuration, if SerDes quad 202A is a local SerDes quad then SerDes quad 202B may be the easter SerDes quad. Similarly, if SerDes quad 202B is a local SerDes quad, then SerDes quad 202A is the wester SerDes quad.

The lane0.cr_tx_gb_bond_cfg through lane3.cr_tx_gb_bond_cfg registers of SerDes quads 202A and 202B indicate the configuration group to which SerDes lanes 304_1-304_3 are bonded.

In the 1×8 link configuration, flop 306_2 of SerDes quad 202A introduces a one period delay to control signals traveling from SerDes quad 202A to the west SerDes quad 202B. Similarly, flop 306_1 of SerDes quad 202B introduces a one period delay to control signals traveling from SerDes quad 202B to SerDes quad 202A.

FIG. 5B illustrates two SerDes quads 202A and 202B in two group configuration. The first group is a 1×6 link configuration where SerDes lanes 304_0-304_3 of SerDes quad 202A and SerDes lanes 304_0-304_1 of SerDes quad 202B are bonded into a group. The second group is 1×2 link configuration where the SerDes lanes 304_2-304_3 of SerDes quad 202B are bonded into a group. The example register configuration for the two groups may be as follows:

| | Register Value |
|---|---|
| Quad 202A Register | |
| lane0.cr_tx_gb_bond_cfg | 6'b011111 |
| lane1.cr_tx_gb_bond_cfg | 6'b011111 |
| lane2.cr_tx_gb_bond_cfg | 6'b011111 |
| lane3.cr_tx_gb_bond_cfg | 6'b011111 |
| quad.cr_east2west_tx_bond_en | 5'b00000 |
| quad.cr_east2west_txout_pipe_cnt | 2'b00 |
| quad.cr_east2west_txin_pipe_cnt | 2'b00 |
| quad.cr_west2east_tx_bond_en | 5'b01111 |
| quad.cr_west2east_txout_pipe_cnt | 2'b00 |
| quad.cr_west2east_txin_pipe_cnt | 2'b00 |
| quad.cr_local_tx_pipe_cnt | 8'b01010101 |
| Quad 202B Register | |
| lane0.cr_tx_gb_bond_cfg | 6'b100011 |
| lane1.cr_tx_gb_bond_cfg | 6'b100011 |
| lane2.cr_tx_gb_bond_cfg | 6'b001100 |
| lane3.cr_tx_gb_bond_cfg | 6'b001100 |
| quad.cr_east2west_tx_bond_en | 5'b00011 |
| quad.cr_east2west_txout_pipe_cnt | 2'b00 |
| quad.cr_east2west_txin_pipe_cnt | 2'b00 |
| quad.cr_west2east_tx_bond_en | 5'b00000 |
| quad.cr_west2east_txout_pipe_cnt | 2'b00 |
| quad.cr_west2east_txin_pipe_cnt | 2'b00 |
| quad.cr_local_tx_pipe_cnt | 8'b00000101 |

In this configuration, if SerDes quad 202A is a local SerDes quad then SerDes quad 202B may be the western SerDes quad. Similarly, if SerDes quad 202B is a local SerDes quad, then SerDes quad 202A is the eastern SerDes quad.

The lane0.cr_tx_gb_bond_cfg through lane3.cr_tx_gb_bond_cfg registers of SerDes quads 202A and lane0.cr_tx_gb_bond_cfg and lane1.cr_tx_gb_bond_cfg registers of SerDes quads 202B indicate that SerDes lanes 304_0-304_3 of SerDes quad 202A and SerDes lanes 304_0-304_1 of SerDes quad 202B are bonded into a first group in a 1×6 configuration. The lane2.cr_tx_gb_bond_cfg and lane3.cr_tx_gb_bond_cfg registers of SerDes quad 202B indicate that lanes 304_2-304_3 of SerDes quad 202B are bonded into a second group in a 1×2 configuration.

In the 1×6 link configuration, flop 306_2 of SerDes quad 202A introduces a one period delay to control signals traveling from SerDes quad 202A to the SerDes quad 202B. Similarly, flop 306_1 of SerDes quad 202B introduces a one time period delay to control signals traveling from SerDes lanes 304_0 and 304_1 of SerDes quad 202B to lanes 304_0 and 304_3 of SerDes quad 202A.

FIG. 5C illustrates two SerDes quads 202A and 202B in a three group configuration. The first group is a 1×1 configuration where SerDes lane 304_0 of SerDes quad 202A operates independently. The second group is a 1×1 configuration where SerDes lane 304_1 of SerDes quad 202A operates independently. The third group is a 1×6 configuration where SerDes lanes 304_2-304_3 of SerDes quad 202A and SerDes lanes 304_0-304_3 of SerDes quad 202B are bonded into a group. The example register configuration for the three groups may be as follows:

| | Register Value |
|---|---|
| Quad 202A Register | |
| lane0.cr_tx_gb_bond_cfg | 6'b000000 |
| lane1.cr_tx_gb_bond_cfg | 6'b000000 |
| lane2.cr_tx_gb_bond_cfg | 6'b011100 |
| lane3.cr_tx_gb_bond_cfg | 6'b011100 |
| quad.cr_east2west_tx_bond_en | 5'b00000 |
| quad.cr_east2west_txout_pipe_cnt | 2'b00 |
| quad.cr_east2west_txin_pipe_cnt | 2'b00 |
| quad.cr_west2east_tx_bond_en | 5'b01100 |
| quad.cr_west2east_txout_pipe_cnt | 2'b00 |
| quad.cr_west2east_txin_pipe_cnt | 2'b00 |
| quad.cr_local_tx_pipe_cnt | 8'b01010000 |
| Quad 202B Register | |
| lane0.cr_tx_gb_bond_cfg | 6'b101111 |
| lane1.cr_tx_gb_bond_cfg | 6'b101111 |
| lane2.cr_tx_gb_bond_cfg | 6'b101111 |
| lane3.cr_tx_gb_bond_cfg | 6'b101111 |
| quad.cr_east2west_tx_bond_en | 5'b01111 |
| quad.cr_east2west_txout_pipe_cnt | 2'b00 |
| quad.cr_east2west_txin_pipe_cnt | 2'b00 |
| quad.cr_west2east_tx_bond_en | 5'b00000 |
| quad.cr_west2east_txout_pipe_cnt | 2'b00 |
| quad.cr_west2east_txin_pipe_cnt | 2'b00 |
| quad.cr_local_tx_pipe_cnt | 8'b01010101 |

In this configuration, if SerDes quad 202A is a local SerDes quad then SerDes quad 202B may be the western SerDes quad. Similarly, if SerDes quad 202B is a local SerDes quad, then SerDes quad 202A is the eastern SerDes quad.

The lane0.cr_tx_gb_bond_cfg register of SerDes quad 202A indicates that SerDes lane 304_0 is an independent lane in its own group. The lane1.cr_tx_gb_bond_cfg register of SerDes quad 202A indicates that SerDes lane 304_1 is an independent lane also in its own group. The lane2.cr_tx_gb_bond_cfg and lane3.cr_tx_gb_bond_cfg registers of SerDes quad 202A and lane0.cr_tx_gb_bond_cfg and lane3.cr_tx_gb_bond_cfg registers of SerDes quad 202B indicate that lanes 304_2-304_3 of SerDes quad 202A and SerDes lanes 304_0-304_3 of SerDes quad 202B are bonded into a third group in a 1×6 configuration.

In the 1×6 link configuration, flop 306_2 of SerDes quad 202A introduces a one period delay to control signals traveling from SerDes quad 202A to SerDes quad 202B. Similarly, flop 306_1 of SerDes quad 202B introduces a one time period delay to control signals traveling from SerDes lanes 304_0 and 304_1 of SerDes quad 202B to SerDes lanes 304_0 and 304_3 of SerDes quad 202A.

Figure 6A:
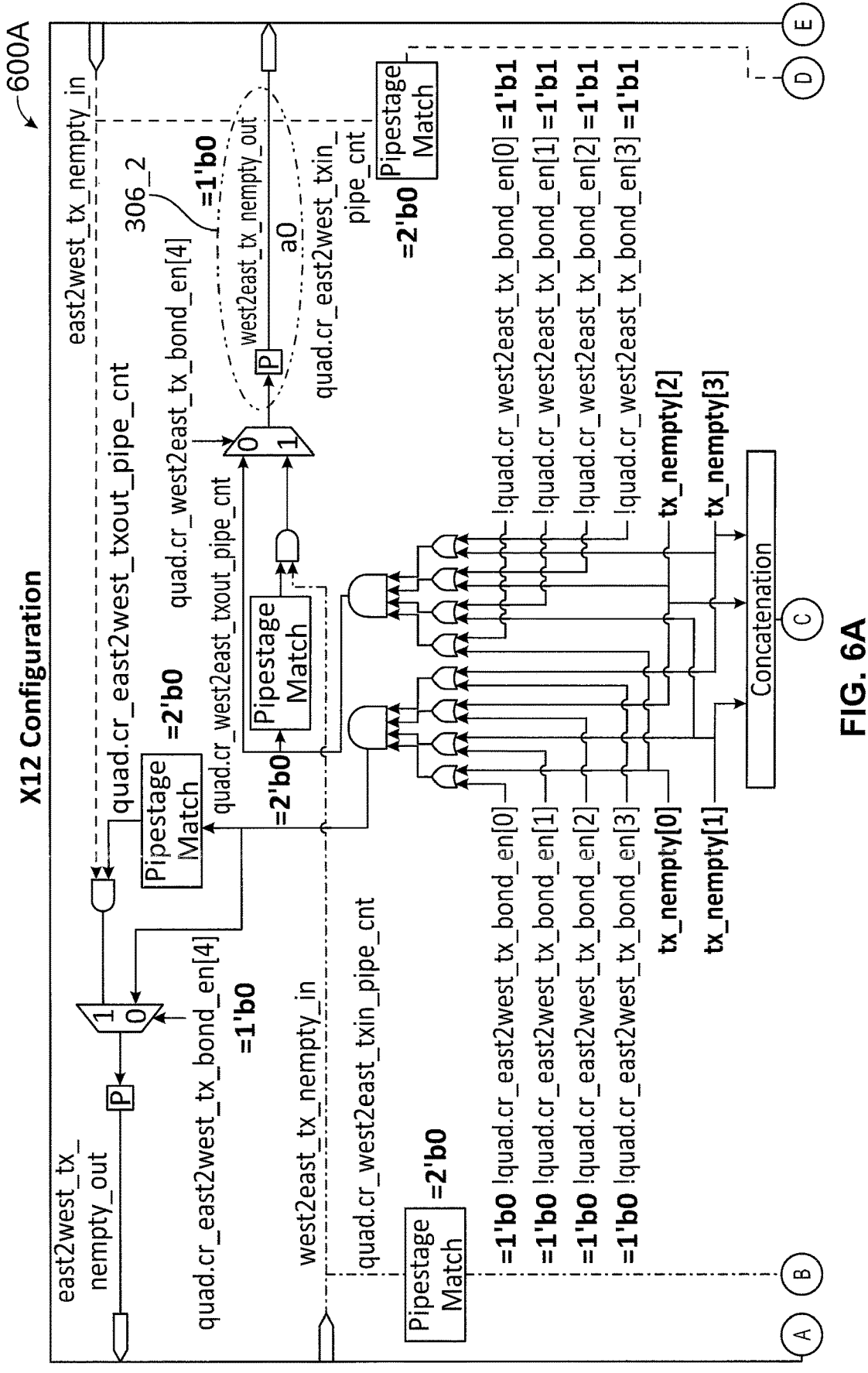
FIGS. 6A-C illustrate three SerDes quads in a single group configuration, according to some embodiments.
Figure 6A:
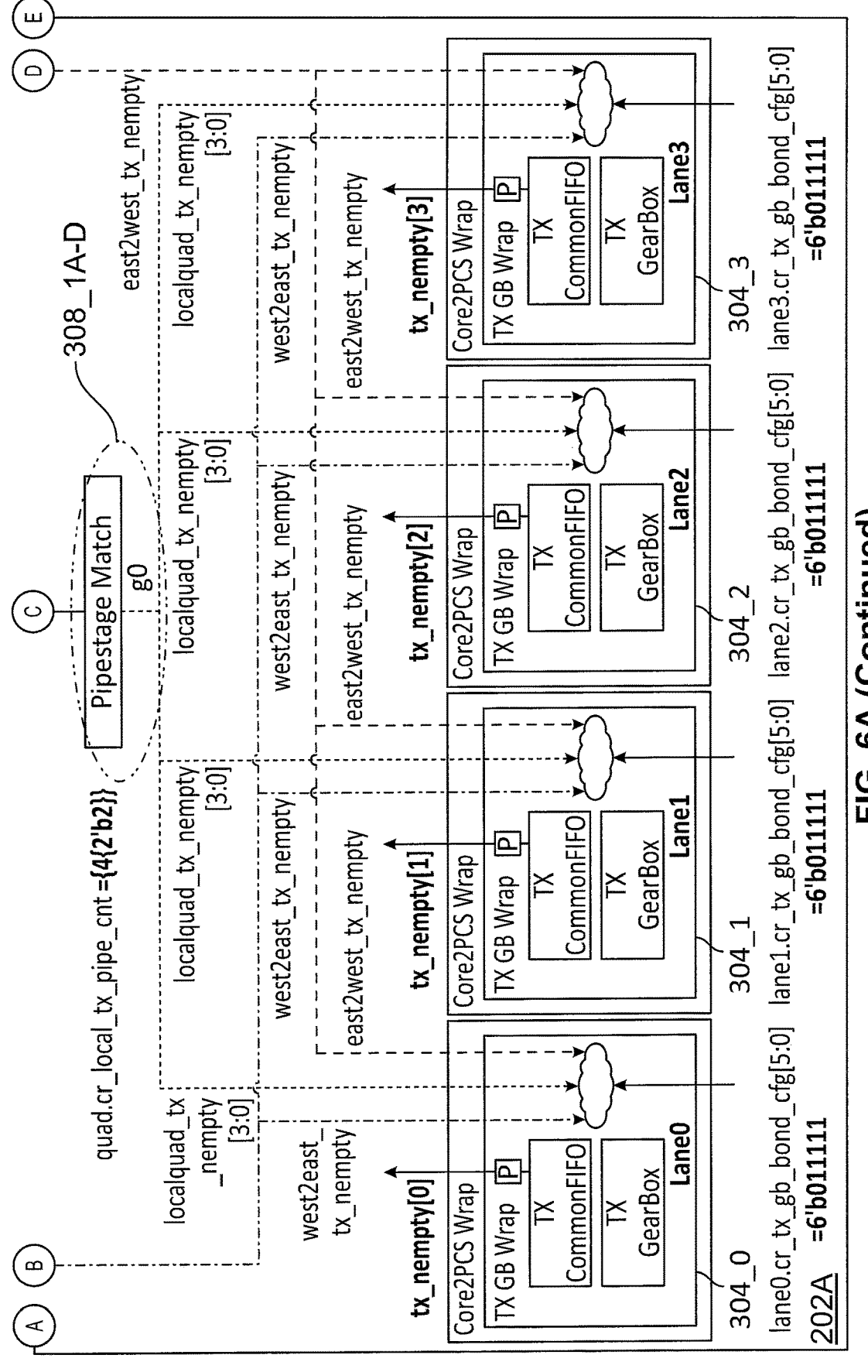
Figure 6B:
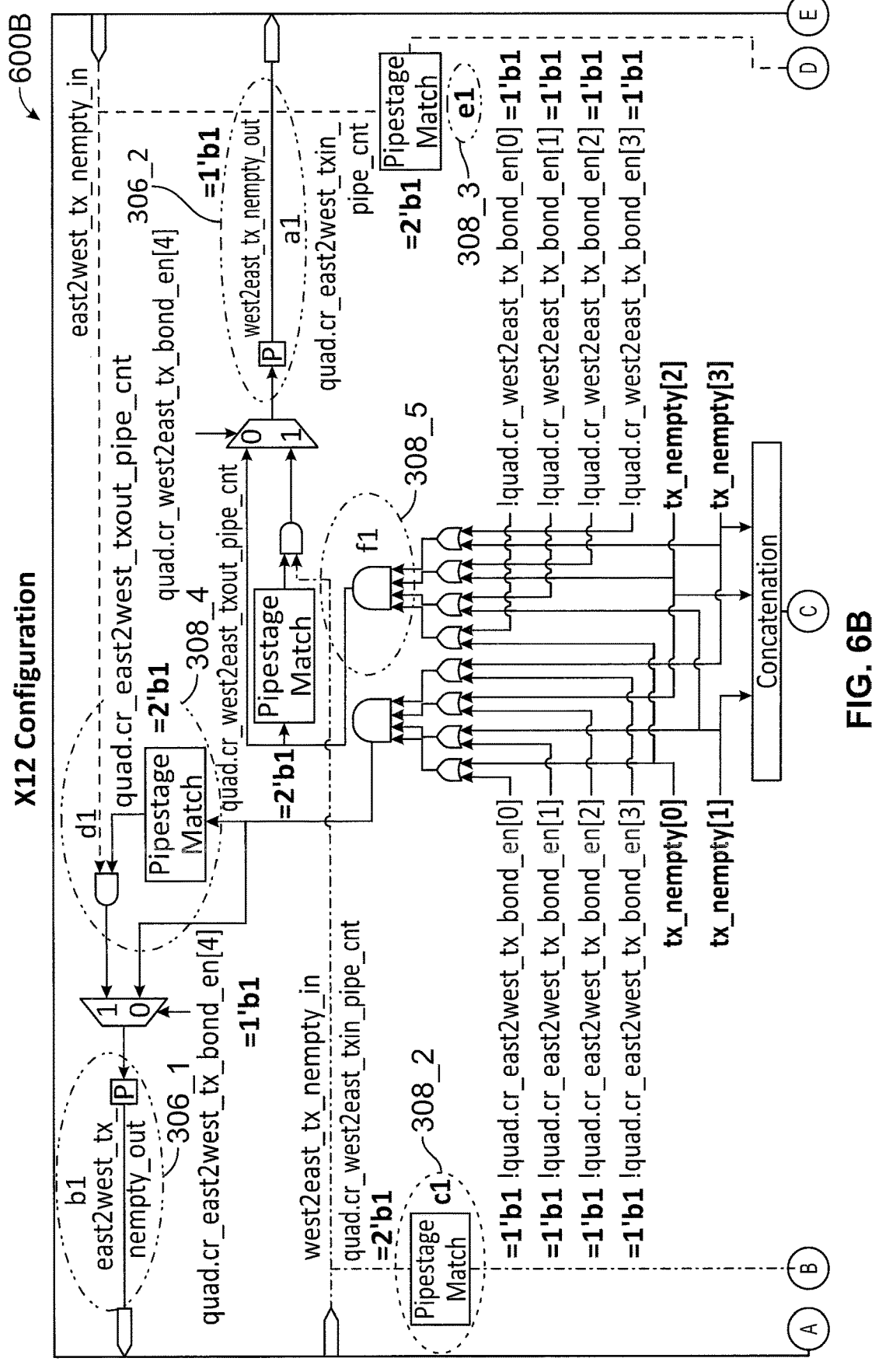
Figure 6B:
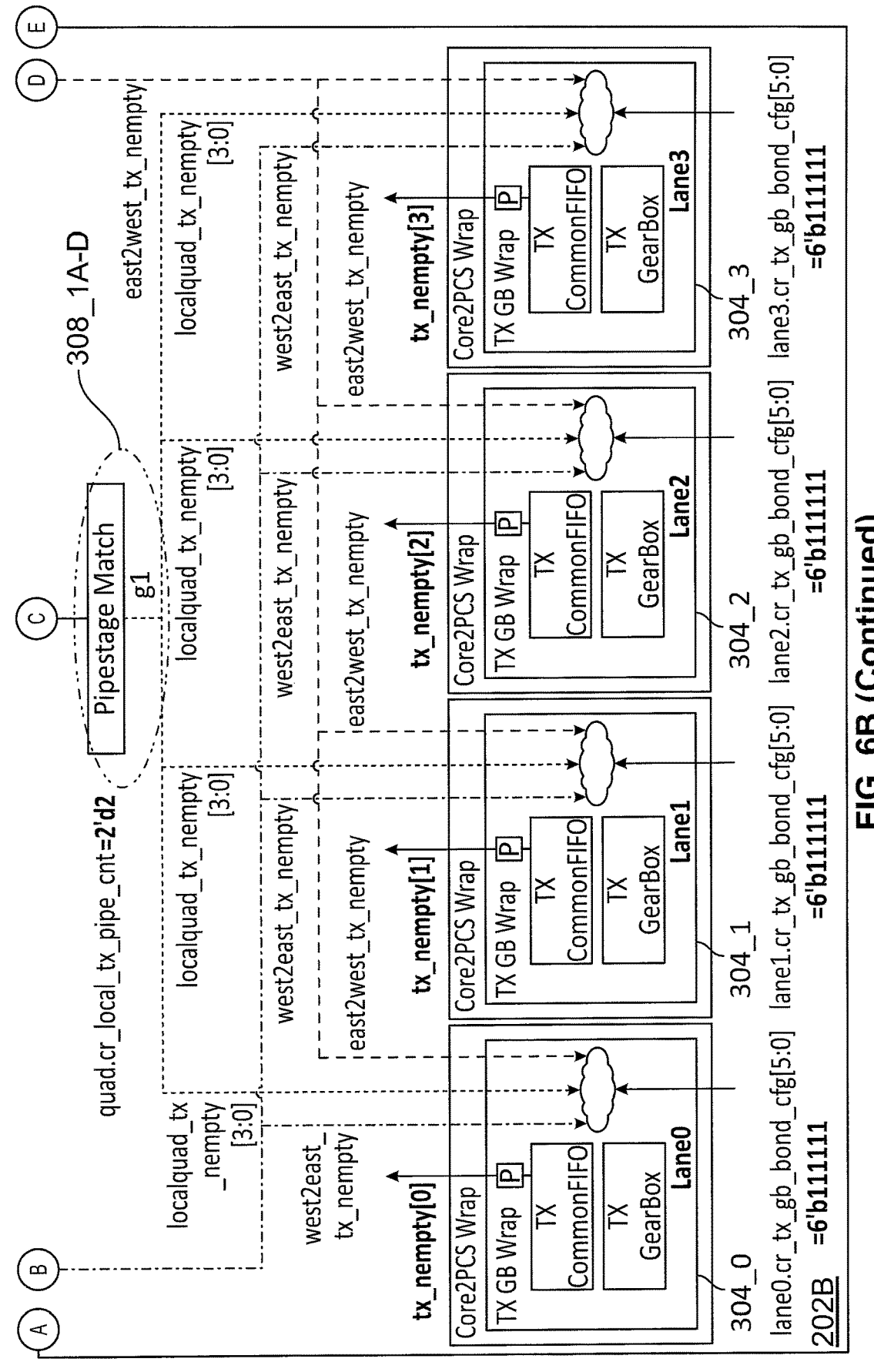
Figure 6C:
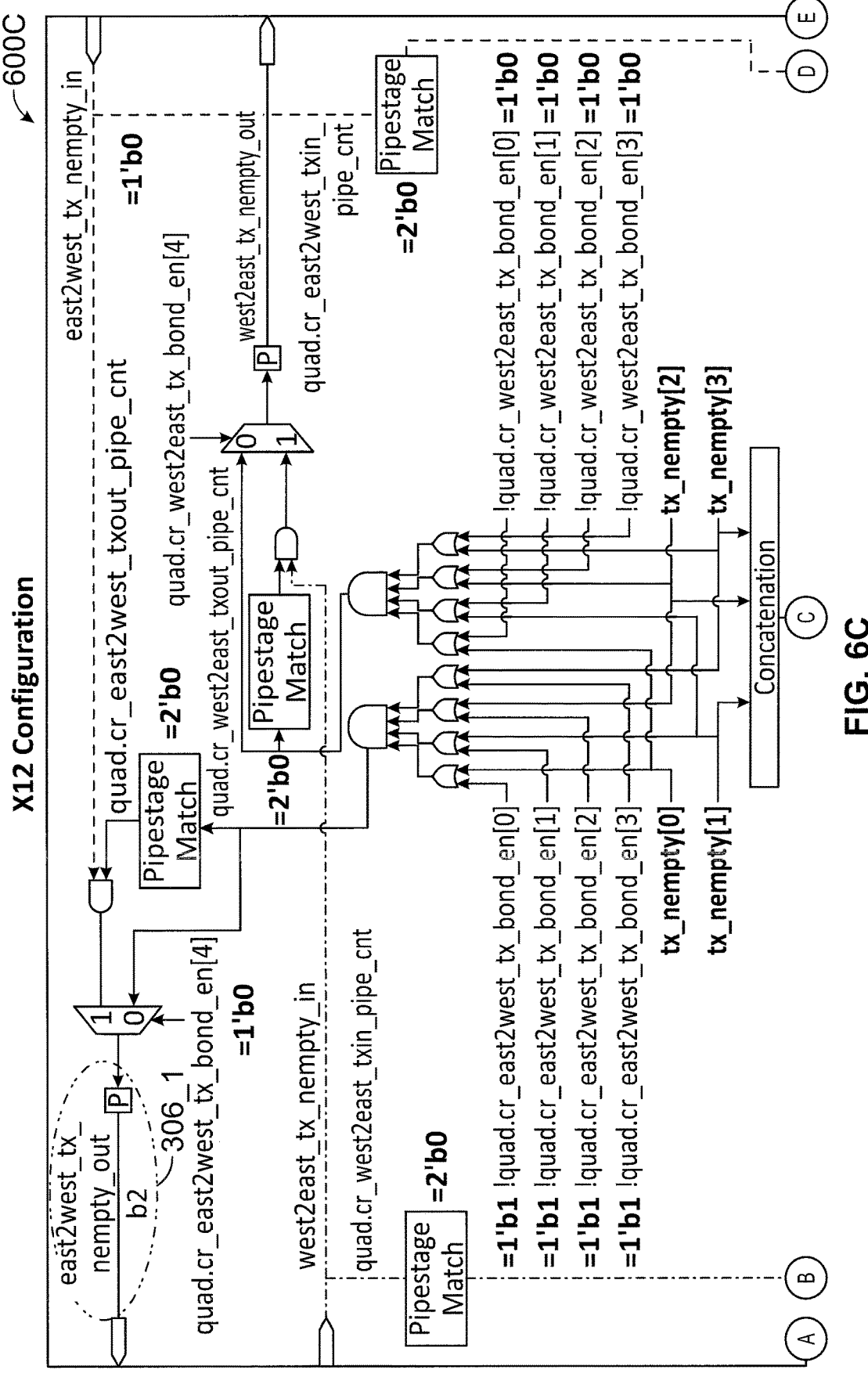
Figure 6C:
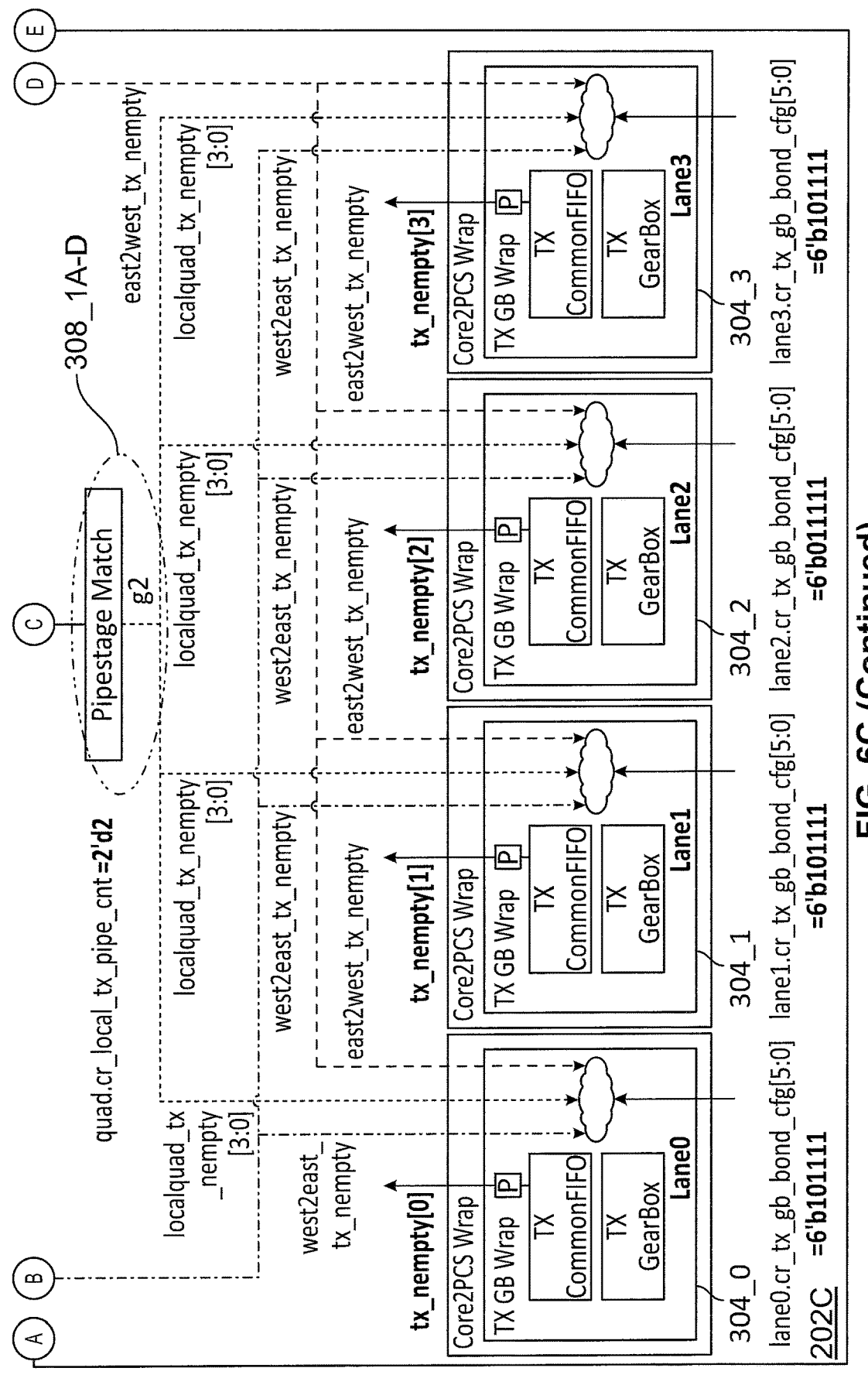

FIGS. 6A-C illustrate three SerDes quads 202A, 202B and 202C in a single group configuration, according to some embodiments. The group configuration illustrated in FIGS. 6A-C is a twelve SerDes lane configuration that includes SerDes lanes 304_0-304_3 of SerDes quad 202A, SerDes lanes 304_0-304_3 of SerDes quad 202B, and SerDes lanes 304_0-304_3 of SerDes quad 202C. For clarity, FIG. 6A illustrates SerDes quad 202A with an overlap to the neighboring east SerDes quad 202B, FIG. 6B illustrates SerDes quad 202B with an overlap to the neighboring west SerDes quad 202A and neighboring east SerDes quad 202C, and FIG. 6C illustrates SerDes quad 202C with an overlap to the neighboring west SerDes quad 202B. FIGS. 6A-C also include a legend depicting the locations of SerDes quads 202A-C.

The example register configuration for the group having 12 SerDes lanes and spread over SerDes quads 202A-C may be as follows:

|  | Register Value |
|---|---|
| Quad 202A Register |  |
| lane0.cr_tx_gb_bond_cfg | 6'b011111 |
| lane1.cr_tx_gb_bond_cfg | 6'b011111 |
| lane2.cr_tx_gb_bond_cfg | 6'b011111 |
| lane3.cr_tx_gb_bond_cfg | 6'b011111 |
| quad.cr_east2west_tx_bond_en | 5'b00000 |
| quad.cr_east2west_txout_pipe_cnt | 2'b00 |
| quad.cr_east2west_txin_pipe_cnt | 2'b00 |
| quad.cr_west2east_tx_bond_en | 5'b01111 |
| quad.cr_west2east_txout_pipe_cnt | 2'b00 |
| quad.cr_west2east_txin_pipe_cnt | 2'b00 |
| quad.cr_local_tx_pipe_cnt | 8'b10101010 |
| Quad 202B Register |  |
| lane0.cr_tx_gb_bond_cfg | 6'b111111 |
| lane1.cr_tx_gb_bond_cfg | 6'b111111 |
| lane2.cr_tx_gb_bond_cfg | 6'b111111 |
| lane3.cr_tx_gb_bond_cfg | 6'b111111 |
| quad.cr_east2west_tx_bond_en | 5'b11111 |
| quad.cr_east2west_txout_pipe_cnt | 2'b01 |
| quad.cr_east2west_txin_pipe_cnt | 2'b01 |
| quad.cr_west2east_tx_bond_en | 5'b11111 |
| quad.cr_west2east_txout_pipe_cnt | 2'b01 |
| quad.cr_west2east_txin_pipe_cnt | 2'b01 |
| quad.cr_local_tx_pipe_cnt | 8'b10101010 |
| Quad 202C Register |  |
| lane0.cr_tx_gb_bond_cfg | 6'b101111 |
| lane1.cr_tx_gb_bond_cfg | 6'b101111 |
| lane2.cr_tx_gb_bond_cfg | 6'b101111 |
| lane3.cr_tx_gb_bond_cfg | 6'b101111 |
| quad.cr_east2west_tx_bond_en | 5'b01111 |
| quad.cr_east2west_txout_pipe_cnt | 2'b00 |
| quad.cr_east2west_txin_pipe_cnt | 2'b00 |
| quad.cr_west2east_tx_bond_en | 5'b00000 |
| quad.cr_west2east_txout_pipe_cnt | 2'b00 |
| quad.cr_west2east_txin_pipe_cnt | 2'b00 |
| quad.cr_local_tx_pipe_cnt | 8'b10101010 |

In this configuration, if SerDes quad 202B is a local quad, then SerDes quad 202C is the western quad and SerDes quad 202A is the eastern quad.

The lane0.cr_tx_gb_bond_cfg through lane3.cr_tx_gb_bond_cfg registers of SerDes quad 202A, the lane0.cr_tx_gb_bond_cfg through lane3.cr_tx_gb_bond_cfg registers of SerDes quad 202B, and the lane0.cr_tx_gb_bond_cfg through lane3.cr_tx_gb_bond_cfg registers of SerDes quad 202C bond the twelve lanes into a group having a 1×12 configuration.

When the control signals traverse SerDes quads 202A-C, the control signals may be synchronized using various flops 306 and pipe stage match modules 308 in SerDes quads 202A-C.

For example, from SerDes lane 304_0 of SerDes quad 202A to SerDes lane 304_3 of SerDes quad 202C the signal may pass through two flops 306_2, such as flop 306_2 (also shown as a0) in SerDes quad 202A in FIG. 6A and flop 306_2 (also shown as al) in SerDes quad 202B in FIG. 6B. In this case, each flop 306_2 may introduce a fixed time delay set to one period.

In another example, from SerDes lane 304_3 of SerDes quad 202C to SerDes lane 304_0 of SerDes quad 202A the signal may pass through two flops 306_1, such as flop 306_1 (also shown as b2) in SerDes quad 202C in FIG. 6C and flop 306_1 (also shown as b1) in SerDes quad 202B in FIG. 6B. In this case, each flop 306_1 may introduce fixed time delay set to one period.

In another example, from SerDes lane 304_0 of SerDes quad 202A to SerDes lane 304_0 of SerDes quad 202B the signal may pass through one flop 306_2, such as flop 306_2 (also shown as a0) in SerDes quad 202A in FIG. 6A and one pipe stage match module 308_2 (also shown as c1) in SerDes quad 202B in FIG. 6B. The flop 306_2 may introduce fixed time delay set to one period and the pipe stage match module 308_2 may synchronize the signal traveling from SerDes lane 304_0 of SerDes quad 202A to lane 304_0 of SerDes quad 202B by introducing a variable time delay set one period.

In another example, from SerDes lane 304_0 of SerDes quad 202B to SerDes lane 304_0 of SerDes quad 202A the signal may pass through pipe stage match module 308_4, such as pipe stage match module 308_4 (also shown as d1) in SerDes quad 202B in FIG. 6B and flop 306_1 (also shown as b1) in SerDes quad 202B in FIG. 6B. In this case, pipe stage match module 308_4 may introduce a variable time delay which may be set to one period, and flop 306_1 may introduce fixed time delay set to one period.

In another example, from SerDes lane 304_3 of SerDes quad 202C to SerDes lane 304_3 of SerDes quad 202B the signal may pass through flop 306_1, such as flop 306_1 (also shown as b2) in SerDes quad 202C in FIG. 6C and pipe stage match module 308_3, such as pipe 308_3 (also shown as e1) in SerDes quad 202B in FIG. 6B. In this case, flop 306_1 may introduce fixed time delay set to one period and pipe stage match module 308_3 may introduce a variable time delay which may be set to one period.

In another example, from SerDes lane 304_3 of SerDes quad 202B to SerDes lane 304_3 of SerDes quad 202C the signal may pass through pipe stage match module 308_5, such as pipe stage match module 308_5 (also shown as f1) in SerDes quad 202B in FIG. 6B and flop 306_2, such as flop 306_2 (also shown as a1) in SerDes quad 202B in FIG. 6B. The flop 306_1 may introduce fixed time delay set to one period, the pipe stage match modules 308_5 may synchronize the signal traveling from SerDes lane 304_3 of SerDes quad 202B to SerDes lane 304_3 of SerDes quad 202C by introducing a variable time delay set one period.

For example, from SerDes lanes within the same SerDes quad 202, such as from SerDes lane 304_0 of SerDes quad 202A to SerDes lane 304_2 of SerDes quad 202A, the signal may pass through pipe stage match modules 308_1A-D shown in FIG. 6A, which may introduce a variable time delay set to two periods.

FIG. 7 is a flowchart of an exemplary method 700 for synchronizing a signal with other signals for transmission within a group of SerDes lanes, according to some embodiments. The operations 702-708 in method 700 may be implemented using the hardware circuitry discussed in FIGS. 1-6A-C. Prior to operations in method 700, the SerDes lanes 304_0-304_3 in SerDes quads 202 may have been divided into configurable groups using configuration registers. For illustrative purposes, suppose SerDes quads 202A-B were configured using configuration registers into a 1×6 and 1×2 group configurations illustrated in FIG. 5B, where a first group includes SerDes lanes 304_0-304_4 of SerDes quad 202A and SerDes lanes 304_0-304_1 of SerDes quad 202B.

At operation 702, a signal from a SerDes lane 304, which may be SerDes lanes 304_0 of SerDes quad 202A may be transmitted to other SerDes lanes 304_1-304_3 of SerDes quad 202A and SerDes lanes 304_0-304_2 of SerDes quad 202B in the group bounded using 1×6 configuration.

At operation 704, the signal from SerDes lanes 304_0 is received at lane bonding control modules 302 associated with SerDes quad 202A and SerDes quad 202B.

At operation 706, the signal from SerDes lanes 304_0 is synchronized with the signals from other SerDes lanes 304_1-304_3 of SerDes quad 202A and SerDes lanes 304_0-304_1 of SerDes quad 202B using flop 306_2 of SerDes quad 202A and one or more pipe stage match modules 308_0-308_5 of SerDes quad 202A or SerDes quad 202B. The one or more pipe stage match modules 308_0-308_5 may be used based on the register configurations that correspond to the group.

At operation 708, the synchronized signals are received. For example, SerDes lanes 304_1-304_3 of SerDes quad 202A and SerDes lanes 304_0-304_1 of SerDes quad 202B receive the synchronized signal and other signals.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

We claim:

1. A circuit comprising:
a plurality of serializer/deserializer (SerDes) quads having a plurality of SerDes lanes, wherein the plurality of SerDes lanes are grouped into a configurable plurality of groups, and a subset of SerDes lanes from the plurality of SerDes lanes in a corresponding group are configured to operate as a bonded link; and
a lane bonding control module having a plurality of flops and a plurality of pipe stage match modules and configured to synchronize signals transmitted in the subset of SerDes lanes, the plurality of flops configured to control timing of the signals using a fixed timing delay and the plurality of pipe stage match modules configured to control timing of the signals using a variable timing delay.

2. The circuit of claim 1, wherein the subset of SerDes lanes in the corresponding group are in at least two SerDes quads in the plurality of SerDes quads.

3. The circuit of claim 1, wherein the subset of SerDes lanes in the corresponding group are in a SerDes quad in the plurality of SerDes quads.

4. The circuit of claim 1, wherein at least one signal in the signals travels between at least two SerDes quads having SerDes lanes in the corresponding group.

5. The circuit of claim 1, wherein the fixed timing delay and the variable timing delay synchronize a signal transmitted from a SerDes lane in the corresponding group with other signals in the signals from other SerDes lanes in the corresponding group.

6. The circuit of claim 5, wherein each pipe stage match module in the plurality of pipe stage match modules is configured to match the variable timing delay of the signal to a fixed timing delay of at least one flop in the plurality of flops.

7. The circuit of claim 1, wherein a SerDes lane in the plurality of SerDes lanes has a plurality of registers, wherein at least one register in the plurality of registers is set to the corresponding group that includes the SerDes lane.

8. The circuit of claim 1, wherein the lane bonding control module is associated with a SerDes quad in the plurality of SerDes quads.

9. The circuit of claim 1, wherein the plurality of SerDes quads provide an input/output functionality for a programmable logic device.

10. The circuit of claim 1, further comprising:
a plurality of lane bonding control modules, wherein the plurality of lane bonding control modules are associated with the plurality of SerDes quads, one lane bonding control module corresponding to one SerDes quad in the plurality of SerDes quads.

11. A circuit comprising:
a first serializer/deserializer (SerDes) quad having a plurality of SerDes lanes, each SerDes lane in the plurality of SerDes lanes having a plurality of registers configured to receive first signals from other SerDes lanes in the plurality of SerDes lanes and a second signal from a second SerDes quad; and
a lane bonding control module configured to synchronize the first signals from the plurality of SerDes lanes and the second signal from the second SerDes quad.

12. The circuit of claim 11, wherein the lane bonding control module comprises a first flop configured to control timing of the second signal from the second SerDes quad using a fixed timing delay.

13. The circuit of claim 11, wherein the lane bonding control module comprises a plurality of pipe stage match modules configured to match timing of the second signal from the second SerDes quad to timing of the first signals.

14. The circuit of claim 11, further comprising:
a third SerDes quad configured to transmit a third signal to the first SerDes quad; and
wherein the lane bonding control module further comprises the first flop configured to control timing of the third signal from the third SerDes quad.

15. The circuit of claim 14, wherein the lane bonding control module further comprises a first pipe stage match module, a second pipe stage match module, and a third pipe stage match module,
wherein the first pipe stage match module is configured to match timing of the first signals to the second signal from the second SerDes quad,
wherein the second pipe stage match module is configured to match timing of the first signals to the third signal from the third SerDes quad, and
wherein the third pipe stage match module is configured to match timing of the second signal from the second SerDes quad to the third signal from the third SerDes quad.

16. The circuit of claim 14, wherein the plurality of registers at the each SerDes lane are configured to receive the third signal from the third SerDes quad synchronized with the first signals and the second signal and process the third signal when a register in the plurality of registers indicates that the first signals, the second signal and the third signal are from SerDes lanes within a same group.

17. A method comprising:

generating a signal at a first serializer/deserializer (SerDes) lane of a plurality of SerDes lanes in a plurality of SerDes quads, wherein the plurality of SerDes lanes are grouped into a plurality of groups;

receiving the signal at a lane bonding control module configured to synchronize the signal from the SerDes lane with other signals from other SerDes lanes associated with a group in the plurality of groups;

synchronizing, using a fixed time delay at a flop in the lane bonding control module and a variable time delay at a pipe stage match module, the signal and the other signals; and receiving the synchronized signal and the other signals at a second SerDes lane in the group at the same time.

18. The method of claim 17, wherein the group includes a first SerDes lane from a first SerDes quad and a second SerDes lane from a second SerDes quad in the plurality of SerDes quads.

19. The method of claim 17, wherein the SerDes lane in the plurality of SerDes lanes has a plurality of registers, wherein at least one register in the plurality of registers is set to the group that includes the SerDes lane.

20. The method of claim 17, wherein the plurality of SerDes quads provide input/output functionality for a field programmable gate array.

* * * * *